US009116397B2

(12) United States Patent
Nakano et al.

(10) Patent No.: US 9,116,397 B2
(45) Date of Patent: Aug. 25, 2015

(54) LIQUID CRYSTAL DISPLAY DEVICE AND METHOD FOR MANUFACTURING THE SAME

(71) Applicant: SEMICONDUCTOR ENERGY LABORATORY CO., LTD., Atsugi-shi, Kanagawa-ken (JP)

(72) Inventors: Masaru Nakano, Kanagawa (JP); Daisuke Kubota, Kanagawa (JP); Akio Yamashita, Kanagawa (JP)

(73) Assignee: Semiconductor Energy Laboratory Co., Ltd., Kanagawa (JP)

( * ) Notice: Subject to any disclaimer, the term of this patent is extended or adjusted under 35 U.S.C. 154(b) by 324 days.

(21) Appl. No.: 13/674,158

(22) Filed: Nov. 12, 2012

(65) Prior Publication Data

US 2013/0128207 A1    May 23, 2013

(30) Foreign Application Priority Data

Nov. 23, 2011    (JP) .................................. 2011-255623

(51) Int. Cl.
*G02F 1/1339*    (2006.01)
*G02F 1/1337*    (2006.01)
*G02F 1/1343*    (2006.01)

(52) U.S. Cl.
CPC .......... *G02F 1/1343* (2013.01); *G02F 1/13394* (2013.01); *G02F 1/133707* (2013.01); *G02F 1/134363* (2013.01)

(58) Field of Classification Search
CPC ............ G02F 1/133707; G02F 1/1343; G02F 1/13394; G02F 1/134363

USPC .................................. 349/129, 141, 155, 156
See application file for complete search history.

(56) References Cited

U.S. PATENT DOCUMENTS

| 6,072,557 | A | * | 6/2000 | Kishimoto | .................... 349/156 |
| 6,097,465 | A | | 8/2000 | Hiroki et al. | |
| 6,115,093 | A | * | 9/2000 | Murai et al. | .................. 349/129 |
| 6,175,395 | B1 | | 1/2001 | Yamazaki et al. | |
| 6,437,845 | B1 | * | 8/2002 | Yamada et al. | ............... 349/129 |

(Continued)

FOREIGN PATENT DOCUMENTS

JP    2010-237660    10/2010

OTHER PUBLICATIONS

U.S. Appl. No. 13/674,143, filed Aug. 2002, Yamada, et al.*

*Primary Examiner* — Michael Caley
*Assistant Examiner* — Jia Pan
(74) *Attorney, Agent, or Firm* — Nixon Peabody LLP; Jeffrey L. Costellia

(57) ABSTRACT

A liquid crystal display device which is resistant to physical impact and can retain high-quality display characteristics is provided. Further, a liquid crystal display device with high reliability and high performance is provided. In a liquid crystal display device in which a liquid crystal composition is interposed between a pair of substrates, a spacer for keeping a gap between the substrates is provided over a structure body provided under a pixel electrode layer or a common electrode layer. The structure body is provided to make the pixel electrode layer and the common electrode layer project into the liquid crystal composition, and the structure body is provided to extend to a region where the spacer is provided. Since the structure body is formed using one continuous film, regions of the surface thereof have substantially the same height and the spacer can be stably provided with good adhesion.

16 Claims, 6 Drawing Sheets

(56) References Cited

U.S. PATENT DOCUMENTS

| | | |
|---|---|---|
| 7,211,825 B2 | 5/2007 | Shih et al |
| 7,327,433 B2 | 2/2008 | Miyachi et al. |
| 7,342,632 B2 | 3/2008 | Miyachi et al. |
| 7,576,829 B2 | 8/2009 | Kikuchi et al. |
| 2006/0203169 A1 | 9/2006 | Ozawa et al. |
| 2006/0227283 A1 | 10/2006 | Ooi et al. |
| 2007/0126969 A1 | 6/2007 | Kimura et al. |
| 2008/0259254 A1 | 10/2008 | Kikuchi et al. |
| 2009/0153761 A1 | 6/2009 | Park et al. |
| 2009/0219466 A1* | 9/2009 | Kagawa et al. ............... 349/96 |
| 2009/0219478 A1* | 9/2009 | Park et al. ................. 349/155 |
| 2010/0165280 A1 | 7/2010 | Ishitani et al. |
| 2010/0195028 A1 | 8/2010 | Kubota et al. |
| 2010/0231842 A1 | 9/2010 | Ishitani et al. |
| 2010/0245724 A1 | 9/2010 | Nishi et al. |
| 2010/0328565 A1* | 12/2010 | Kubota et al. ............... 349/43 |
| 2011/0096255 A1* | 4/2011 | Rho et al. .................. 349/33 |
| 2011/0122332 A1* | 5/2011 | Kubota et al. ............... 349/44 |
| 2011/0128491 A1 | 6/2011 | Kubota et al. |

* cited by examiner

LIQUID CRYSTAL DISPLAY DEVICE AND METHOD FOR MANUFACTURING THE SAME

BACKGROUND OF THE INVENTION

1. Field of the Invention

The present invention relates to a liquid crystal display device and a method for manufacturing the same.

2. Description of the Related Art

In recent years, a liquid crystal element in which liquid crystal is interposed between a pair of electrodes has been used for a variety of devices; in particular, a liquid crystal display device (liquid crystal display) having advantages of thinness and lightness has been used for displays in a wide range of fields.

In a liquid crystal display device, the thickness (cell thickness) of liquid crystal of a liquid crystal element is an important factor affecting display, operation characteristics, and the like, and the cell thickness is controlled by a spacer which keeps a gap between a pair of substrates between which a liquid crystal element is interposed.

In order to realize a cell thickness suitable for characteristics needed for a liquid crystal display device, a formation method or an arrangement method of a spacer is examined (see Patent Document 1, for example).

REFERENCE

Patent Document

[Patent Document 1] Japanese Published Patent Application No. 2010-237660

SUMMARY OF THE INVENTION

Liquid crystal display devices are favorably used for a touch panel which is operated by touching a display screen, a mobile device, and a large outdoor display screen. In the use of such devices, physical impact is applied to the liquid crystal display devices in many cases, and accordingly, the liquid crystal display devices are required to have high resistance to physical impact.

An object is to provide a liquid crystal display device which is resistant to physical impact and can retain high-quality display characteristics.

An object is to provide a liquid crystal display device with high reliability and high performance.

In a liquid crystal display device in which a liquid crystal composition is interposed between a pair of substrates, a spacer for keeping a gap between the substrates is provided over a structure body provided under a pixel electrode layer (first electrode layer) or a common electrode layer (second electrode layer). The structure body is provided to make the pixel electrode layer and the common electrode layer project into the liquid crystal composition, and the structure body is provided to extend to a region where the spacer is provided. Since the structure body is formed using one continuous film, regions of the surface thereof have substantially the same height and the spacer can be stably provided with good adhesion.

In the liquid crystal display device, the spacer has a function of controlling a height of a space which is sandwiched between the facing substrates and filled with the liquid crystal composition (the space is also referred to as a cell gap), and a function of keeping the height against external impact such as pressure.

Further, by widely providing the structure body to reach a region where the spacer is to be formed, when the spacer provided for a counter substrate is placed on an element substrate side, a region where the spacer can be stably placed can be wide. Note that the spacer is placed over a surface at the same height as the upper surface (the most projecting surface) of the structure body; therefore, even if the spacer provided for the counter substrate is moved to align on the element substrate side, an adjacent structure body is not damaged.

In the case where a plurality of divided structure bodies is provided, at least one of the structure bodies provided under a pixel electrode layer or a common electrode layer is continuously provided to reach a region where a spacer is formed.

Accordingly, defects in an arrangement step of a spacer, due to misalignment of a spacer, or the like can be reduced, leading to improvement in a yield.

Note that in this specification, a substrate provided with an element layer is referred to as an element substrate and a substrate facing the element substrate is referred to as a counter substrate in some cases.

The spacer can be stably provided in a substantially flat region with less steep unevenness and fewer steep steps in the liquid crystal display device; thus, damage and a shape defect of the spacer due to physical impact can be reduced and the liquid crystal display device can have high resistance to physical impact.

Accordingly, a liquid crystal display device which is resistant to physical impact and can retain high-quality display characteristics can be provided. Further, a liquid crystal display device with high reliability and high performance can be provided.

As the liquid crystal composition, a liquid crystal composition exhibiting a blue phase can be favorably used.

A blue phase is exhibited in a liquid crystal composition having strong twisting power and the liquid crystal composition has a double twist structure. The liquid crystal composition shows a cholesteric phase, a cholesteric blue phase, an isotropic phase, or the like depending on conditions.

A cholesteric blue phase which is a blue phase includes three structures of blue phase I, blue phase II, and blue phase III from the low temperature side. A cholesteric blue phase which is a blue phase is optically isotropic, and blue phase I and blue phase II have body-centered cubic symmetry and simple cubic symmetry, respectively. In the cases of blue phase I and blue phase II, Bragg diffraction is seen in the range from ultraviolet light to visible light.

A chiral material is used to induce twisting of the liquid crystal composition, align the liquid crystal composition in a helical structure, and make the liquid crystal composition exhibit a blue phase. For the chiral material, a compound which has an asymmetric center, high compatibility with the liquid crystal composition, and strong twisting power is used. In addition, the chiral material is an optically active substance; a higher optical purity is better and the most preferable optical purity is 99% or higher.

An embodiment of a structure of the invention disclosed in this specification is a liquid crystal display device including a first substrate and a second substrate with a liquid crystal composition interposed therebetween; a first structure body projecting into the liquid crystal composition from a surface of the first substrate on the liquid crystal composition side; a second structure body provided between a first region and a second region of the first structure body and projecting into the liquid crystal composition from the surface of the first substrate on the liquid crystal composition side; a pixel electrode layer over the first structure body; a common electrode layer over the second structure body; and a spacer over the first structure body or the second structure body. The first structure body and the second structure body are each continuously provided. The spacer is provided over an upper surface of the continuous first structure body or the continuous second structure body together with the pixel electrode layer or the common electrode layer.

Another embodiment of a structure of the invention disclosed in this specification is a liquid crystal display device including a first substrate and a second substrate with a liquid crystal composition interposed therebetween; a plurality of first structure bodies projecting into the liquid crystal composition from a surface of the first substrate on the liquid crystal composition side; a plurality of second structure bodies provided between the plurality of first structure bodies and projecting into the liquid crystal composition from the surface of the first substrate on the liquid crystal composition side; a pixel electrode layer over the plurality of first structure bodies; a common electrode layer over the plurality of second structure bodies; and a spacer over at least one of the plurality of first structure bodies and the plurality of second structure bodies. The spacer is provided over an upper surface of at least one of the plurality of first structure bodies and the plurality of second structure bodies, each of which is continuously provided, together with the pixel electrode layer or the common electrode layer.

The shapes of the first and second structure bodies are determined by the shapes of the pixel electrode layer and the common electrode layer, which are formed over the top surfaces and the side surfaces thereof, and the first and second structure bodies each have an opening pattern and a shape including a bend portion or a branching comb-like shape.

The first and second structure bodies are each tapered and rib-shaped. It is preferable that the pixel electrode layer and the common electrode layer be provided to cover upper surfaces and side surfaces of the rib-shaped first and second structure bodies because the formation areas of the pixel electrode layer and the common electrode layer can also be increased in the thickness direction (three-dimensionally) of the liquid crystal composition. Accordingly, when voltage is applied between the pixel electrode layer and the common electrode layer, an electric field can be widely formed between the pixel electrode layer and the common electrode layer.

In addition, when a second common electrode layer is provided on the second substrate side, an electric field can be applied to liquid crystal in an oblique direction (in a direction oblique to the substrate) between the pixel electrode layer and the second common electrode layer; thus, liquid crystal molecules can be controlled more efficiently.

Therefore, the liquid crystal molecules in the entire liquid crystal composition including a thickness direction can be made to respond and white transmittance can be improved. Accordingly, contrast ratio, which is a ratio of white transmittance to black transmittance (light transmittance in black display), can also be increased. Further, an electric field can be effectively applied even to a liquid crystal material (liquid crystal mixture) exhibiting a blue phase, which has high viscosity; therefore, reduction in power consumption can also be achieved.

Each of the structure bodies can be formed using an insulator which includes an insulating material (an organic material or an inorganic material) or a conductor which includes a conductive material (an organic material or an inorganic material). Typically, a visible light curable resin, an ultraviolet curable resin, or a thermosetting resin is preferably used. For example, an acrylic resin, an epoxy resin, an amine resin, or the like can be used. Moreover, the structure bodies may be formed using a conductive resin or a metal material. Note that the structure bodies may have a stacked-layer structure of plural thin films.

Each of the structure bodies can have a columnar shape, a truncated conical or pyramidal shape with a flat top surface and a trapezoidal cross section, a conical or pyramidal shape with a rounded dome top, or the like. In this specification, since the pixel electrode layer and the common electrode layer are formed so as to cover surfaces (top surfaces and side surfaces) of the structure bodies, it is preferable that the structure bodies each have a curved surface with little unevenness so as to be favorably covered with the pixel electrode layer and the common electrode layer. Further, a material with a light-transmitting property with respect to visible light is preferably used for the structure bodies because reduction in aperture ratio and white transmittance can be prevented.

Furthermore, each of the structure bodies may be a portion which projects into the liquid crystal composition from a surface of the substrate on the liquid crystal composition side; thus, an interlayer film may be processed so that the surface on the liquid crystal composition side is uneven, whereby a projected structure body may be obtained.

In this specification, the pixel electrode layer and the common electrode layer each have a comb-like pattern which does not form a closed space and is opened. The pixel electrode layer and the common electrode layer are not in contact with each other, and they are provided on the same insulating surface (e.g., the same substrate or the same insulating film) such that their comb-like patterns are engaged with each other.

When the liquid crystal composition is polymerized to be a high molecular compound, the liquid crystal composition is stabilized and the temperature range in which a blue phase is exhibited can be extended. Treatment in which a liquid crystal composition is polymerized to be a high molecular compound is referred to as polymer stabilization treatment. As a liquid crystal composition exhibiting a blue phase, a liquid crystal composition including nematic liquid crystal and a chiral material is used. In the case where polymer stabilization treatment is performed, a polymerizable monomer and a polymerization initiator are further included in the liquid crystal composition. Note that polymer stabilization treatment can be performed in such a manner that a liquid crystal composition is irradiated with light to be a high molecular compound with the use of a photopolymerizable monomer and a photopolymerization initiator, for example.

The liquid crystal compound subjected to polymer stabilization treatment loses (or has lower) fluidity and becomes a solid with a low impact-absorbing property (or becomes almost a solid). In a liquid crystal composition with a low impact-absorbing property, impact caused by movement of a spacer more adversely affects display quality to cause a display defect; therefore, a stable spacer resistant to physical impact, such as the spacer disclosed in this specification, is effective.

According to an embodiment of the present invention, a technique by which a liquid crystal display device is more resistant to physical impact and can retain high-quality display characteristics can be provided.

According to an embodiment of the present invention, a liquid crystal display device can obtain high reliability and high performance.

BRIEF DESCRIPTION OF THE DRAWINGS

In the accompanying drawings:

FIGS. 4A1, 4A2, and 4B illustrate an embodiment of a liquid crystal display device;

DETAILED DESCRIPTION OF THE INVENTION

Figure 1A:
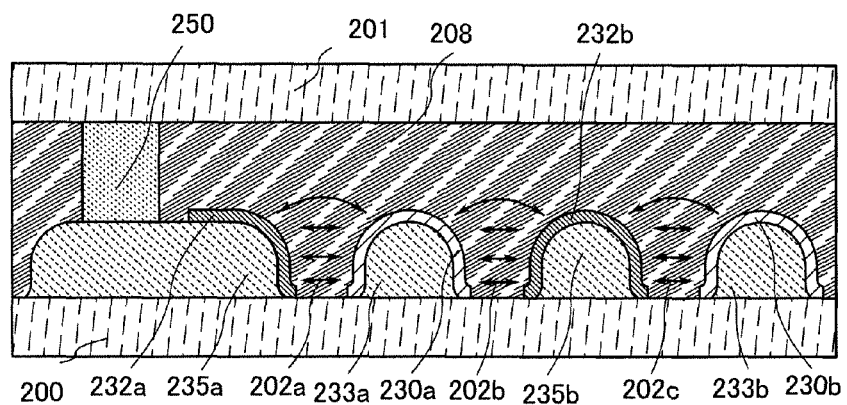
FIGS. 1A to 1C are each a conceptual diagram illustrating a liquid crystal display device and a method for manufacturing the liquid crystal display device.

Embodiments will be described in detail with reference to the drawings. Note that the present invention is not limited to the following description, and it will be easily understood by those skilled in the art that modes and details can be modified in various ways without departing from the spirit and scope of the present invention. Therefore, the present invention should not be construed as being limited to the following description of the embodiments. In the structures to be given below, the same portions or portions having similar functions are denoted by the same reference numerals in different drawings, and explanation thereof will not be repeated.

Note that the ordinal numbers such as "first", "second", and "third" in this specification are used for convenience and do not denote the order of steps and the stacking order of layers. In addition, the ordinal numbers in this specification do not denote particular names which specify the present invention.

Embodiment 1

A liquid crystal composition and a liquid crystal display device including the liquid crystal composition, which are embodiments of the present invention, will be described with reference to FIGS. 1A to 1C.

In a liquid crystal display device, a spacer has a function of controlling a height of a space which is sandwiched between facing substrates and filled with a liquid crystal composition (the space is also referred to as a cell gap), and a function of keeping the height against external impact such as pressure.

A spacer is provided for a counter substrate, and then an element substrate and the counter substrate are attached to each other so that the spacer is placed in a space between the substrates; thus, the spacer can be placed inside the liquid crystal display device.

However, since an element layer is provided under an insulating film over which the spacer is provided, a surface of the insulating film has unevenness or a step due to a transistor, a conductive film, a component for adjusting a cell gap, or the like included in the element layer. When physical impact is externally applied to the spacer provided in an unstable region due to unevenness or a step, the spacer might be damaged or moved because of local concentration of the force or the like, leading to alignment disorder of a liquid crystal composition and a display defect due to the alignment disorder.

Therefore, it is important that the spacer has high resistance to physical impact and is stably provided over a flat region in the liquid crystal display device in order to prevent damage and a shape defect due to physical impact.

In this embodiment, a liquid crystal composition exhibiting a blue phase is used. In a liquid crystal display device including a liquid crystal composition exhibiting a blue phase, a method in which gradation is controlled by generation of an electric field generally parallel (i.e., in a lateral direction) to a substrate to move liquid crystal molecules in a plane parallel to the substrate can be used. In such a method, an electrode structure used in an in-plane switching (IPS) mode can be employed.

In a lateral electric field mode such as an IPS mode, a first electrode layer (e.g., a pixel electrode layer with which voltage is controlled in each pixel) and a second electrode layer (e.g., a common electrode layer with which common voltage is applied to all pixels), each of which has an opening pattern, are located below a liquid crystal composition. The first electrode layer and the second electrode layer have not a plane shape but various opening patterns including a bent portion or a branching comb-like portion. An arrangement of the first electrode layer and the second electrode layer, which complies with both conditions that they have the same shape and they completely overlap with each other, is avoided in order to generate an electric field between the electrodes.

By applying an electric field between the pixel electrode layer and the common electrode layer, liquid crystal is controlled. An electric field in a parallel direction is applied to the liquid crystal, so that liquid crystal molecules can be controlled using the electric field. That is, the liquid crystal molecules aligned in parallel to the substrate can be controlled in a direction parallel to the substrate, whereby a wide viewing angle is obtained.

Figure 1B:
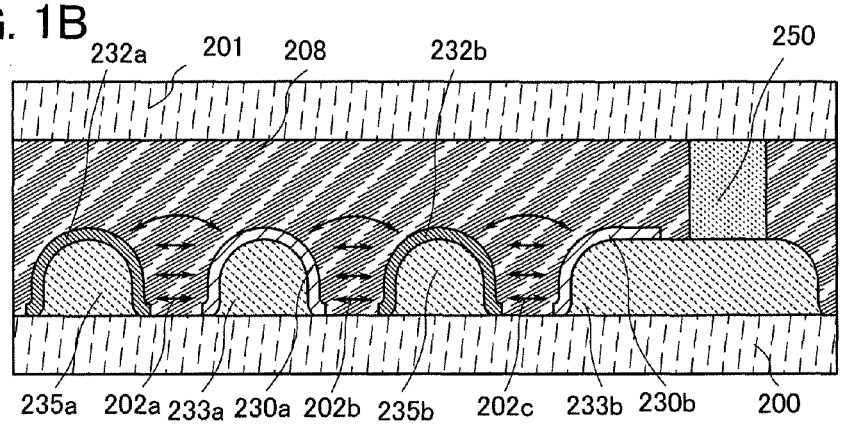
Figure 1C:
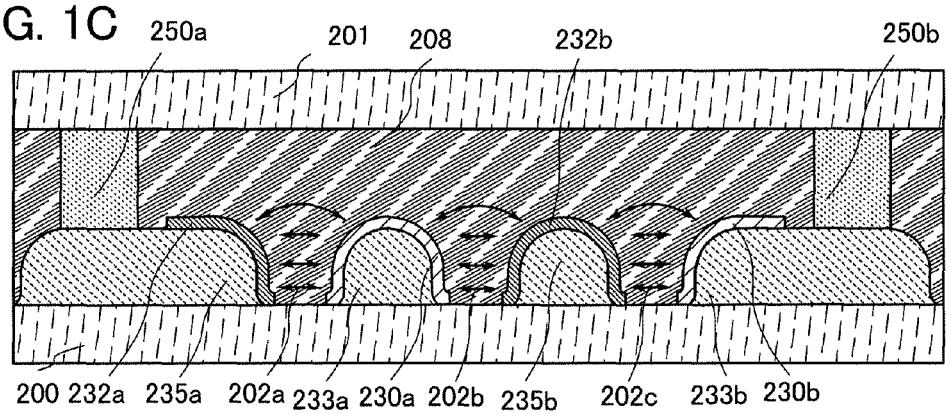

FIGS. 1A to 1C each illustrate a liquid crystal display device in which a first substrate 200 and a second substrate 201 are positioned so as to face each other with a liquid crystal composition 208 interposed therebetween. First structure bodies 233a and 233b, pixel electrode layers 230a and 230b, second structure bodies 235a and 235b, and common electrode layers 232a and 232b are provided between the first substrate 200 and the liquid crystal composition 208. The first structure bodies 233a and 233b and the second structure bodies 235a and 235b are provided so as to project into the liquid crystal composition 208 from a surface of the first substrate 200 on the liquid crystal composition 208 side.

The pixel electrode layers 230a and 230b are formed to cover top surfaces and side surfaces of the first structure bodies 233a and 233b which are provided to project into the liquid crystal composition 208 from the surface of the first substrate 200 on the liquid crystal composition 208 side (a surface which faces the liquid crystal composition 208). The common electrode layers 232a and 232b are formed to cover top surfaces and side surfaces of the second structure bodies 235a and 235b which are provided to project into the liquid crystal composition 208 from the surface of the first substrate 200 on the liquid crystal composition 208 side.

In this embodiment, a spacer is provided over a first structure body and/or a second structure body. FIG. 1A illustrates an example in which a spacer 250 is provided over the second structure body 235a. The spacer 250 and the common electrode layer 232a are formed over the same surface of the second structure body 235a to be adjacent to each other.

FIG. 1B illustrates an example in which the spacer 250 is provided over the first structure body 233b. The spacer 250 and the pixel electrode layer 230b are formed over the same surface of the first structure body 233b to be adjacent to each other.

FIG. 1C illustrates an example in which a spacer 250a and a spacer 250b are provided over the second structure body 235a and the first structure body 233b, respectively. The spacer 250a and the common electrode layer 232a are formed over the same surface of the second structure body 235a to be adjacent to each other, and the spacer 250b and the pixel electrode layer 230b are formed over the same surface of the first structure body 233b to be adjacent to each other.

Thus, when a structure body is provided to extend to a region where a spacer is to be formed, since the structure body is formed using one continuous film, regions of the surface thereof have substantially the same height and the spacer can be stably provided with good adhesion.

Further, by widely providing the structure body to reach a region where the spacer is to be formed, when the spacer provided for a counter substrate is placed on an element substrate side, a region where the spacer can be stably placed can be wide.

Note that the spacer is placed over a surface at the same height as the upper surface (the most projecting surface) of the structure body; therefore, even if the spacer provided for the counter substrate is moved to align on the element substrate side, an adjacent structure body is not damaged.

Accordingly, defects in an arrangement step of a spacer, due to misalignment of a spacer, or the like can be reduced, leading to improvement in a yield.

The spacer can be stably provided in a substantially flat region with less steep unevenness and fewer steep steps in the liquid crystal display device; thus, damage and a shape defect of the spacer due to physical impact can be reduced and the liquid crystal display device can have high resistance to physical impact.

Accordingly, a liquid crystal display device which is resistant to physical impact and can retain high-quality display characteristics can be provided. Further, a liquid crystal display device with high reliability and high performance can be provided.

In this embodiment, tapered and rib-shaped structure bodies are used for the first structure bodies 233a and 233b and the second structure bodies 235a and 235b. The shapes of the rib-shaped first structure bodies and the rib-shaped second structure bodies are determined by the shapes of the pixel electrode layer and the common electrode layer, which are formed over the top surfaces and the side surfaces thereof, and the first structure bodies and the second structure bodies each have an opening pattern and a shape including a bend portion or a branching comb-like shape.

The first structure bodies 233a and 233b and the second structure bodies 235a and 235b are structure bodies each having a dome shape with a rounded top and a generally semicircular cross section. When a structure body has such a curved surface, a pixel electrode layer or a common electrode layer stacked thereover can be formed to have a favorable shape with favorable coverage.

Since the pixel electrode layer and the common electrode layer each have not a plate-like shape but a shape with an opening pattern, a plurality of divided pixel electrode layers 230a and 230b and a plurality of divided common electrode layers 232a and 232b are illustrated in a cross-sectional view.

It is preferable that in a pixel region, the pixel electrode layers 230a and 230b and the common electrode layers 232a and 232b each have a comb-like pattern which does not form a closed space and is opened. The pixel electrode layers 230a and 230b and the common electrode layers 232a and 232b are not in contact with each other, and they are provided over the same insulating surface, that is, over the first substrate 200 such that their comb-like patterns are engaged with each other.

In the liquid crystal display device of each of FIGS. 1A to 1C, the pixel electrode layers 230a and 230b are provided so as to cover the top surfaces and the side surfaces of the first structure bodies 233a and 233b and the common electrode layers 232a and 232b are provided so as to cover the top surfaces and the side surfaces of the second structure bodies 235a and 235b, whereby the formation area of the pixel electrode layers 230a and 230b and the common electrode layers 232a and 232b can be increased in a thickness direction (three-dimensionally) of the liquid crystal composition 208. Accordingly, as illustrated in each of FIGS. 1A to 1C, an electric field indicated by an arrow 202a, an electric field indicated by an arrow 202b, and an electric field indicated by an arrow 202c are applied widely in a thickness direction of the liquid crystal composition, between the pixel electrode layer 230a and the common electrode layer 232a, between the pixel electrode layer 230a and the common electrode layer 232b, and between the pixel electrode layer 230b and the common electrode layer 232b, respectively. Note that as indicated by the arrows 202a, 202b, and 202c, potential lines are curved above top surfaces of (in upper regions between) the pixel electrode layers 230a and 230b and the common electrode layers 232a and 232b.

Accordingly, when voltage is applied between the pixel electrode layers 230a and 230b and the common electrode layers 232a and 232b, an electric field can be widely formed between the pixel electrode layers 230a and 230b and the common electrode layers 232a and 232b in the liquid crystal composition 208. Thus, liquid crystal molecules can be controlled using the electric field.

Therefore, the liquid crystal molecules in the entire liquid crystal composition 208 including a thickness direction can be made to respond and white transmittance can be improved. Accordingly, contrast ratio, which is a ratio of white transmittance to black transmittance (light transmittance in black display), can also be increased. Further, an electric field can be effectively applied even to a liquid crystal material (liquid crystal mixture) exhibiting a blue phase, which has high viscosity; therefore, reduction in power consumption can also be achieved.

Each of the structure bodies (the first structure bodies and the second structure bodies) can be formed using an insulator which includes an insulating material (an organic material or an inorganic material) or a conductor which includes a conductive material (an organic material or an inorganic material). Typically, a visible light curable resin, an ultraviolet curable resin, or a thermosetting resin is preferably used. For example, an acrylic resin, an epoxy resin, an amine resin, or the like can be used. Moreover, the structure bodies may be formed using a conductive resin or a metal material. Note that the structure bodies may have a stacked-layer structure of plural thin films.

Each of the structure bodies can have a columnar shape, a truncated conical or pyramidal shape with a flat top surface and a trapezoidal cross section, a conical or pyramidal shape with a rounded dome top, or the like. In this specification, since the pixel electrode layer and the common electrode layer are formed so as to cover surfaces (top surfaces and side surfaces) of the structure bodies, it is preferable that the structure bodies each have a curved surface with little unevenness so as to be favorably covered with the pixel electrode layer and the common electrode layer. Further, a material with a light-transmitting property with respect to visible light is preferably used for the structure bodies because reduction in aperture ratio and white transmittance can be prevented.

Furthermore, the structure bodies may each be a portion which projects into the liquid crystal composition from a surface of the substrate on the liquid crystal composition side; thus, an interlayer film may be processed so that the surface on the liquid crystal composition side is uneven, whereby a projected structure body may be obtained.

Note that the shapes of the pixel electrode layer and the common electrode layer which are formed over the structure bodies reflect the shapes of the structure bodies and are also influenced by an etching process method.

The first structure bodies 233a and 233b and the second structure bodies 235a and 235b can be formed using the same process and the same material, and the pixel electrode layers 230a and 230b and the common electrode layers 232a and 232b can be formed using the same process and the same material. Needless to say, the first structure bodies 233a and 233b and the second structure bodies 235a and 235b may be formed using different processes or different materials, and the pixel electrode layers 230a and 230b and the common electrode layers 232a and 232b may be formed using different processes or different materials; the liquid crystal display device can be manufactured by combining any of these examples as appropriate.

The spacer 250 may be formed by an inkjet method or a printing method; alternatively, the spacer 250 may be formed in such a manner that a film is formed over the entire surface of the second substrate 201 which is a counter substrate by a coating method or the like and then part of the film is selectively removed with the use of a mask.

The spacer 250 can be formed using an organic material or an inorganic material. Typically, a visible light curable resin, an ultraviolet curable resin, a thermosetting resin, a photosensitive resin, or the like can be used. For example, a photosensitive material such as an acrylic resin, an epoxy resin, an amine resin, or the like can be used. In this embodiment, photosensitive polyimide is used.

The liquid crystal composition 208 can be formed by a dispenser method (dropping method), or an injection method in which liquid crystal is injected using capillary action or the like after the first substrate 200 and the second substrate 201 are attached to each other.

In this embodiment, a liquid crystal composition including nematic liquid crystal and a chiral material and exhibiting a blue phase is used as the liquid crystal composition 208.

Examples of the nematic liquid crystal include a biphenyl-based compound, a terphenyl-based compound, a phenylcyclohexyl-based compound, a biphenylcyclohexyl-based compound, a phenylbicyclohexyl-based compound, a benzoic acid phenyl-based compound, a cyclohexyl benzoic acid phenyl-based compound, a phenyl benzoic acid phenyl-based compound, a bicyclohexyl carboxylic acid phenyl-based compound, an azomethine-based compound, an azo-based compound, an azoxy-based compound, a stilbene-based compound, a bicyclohexyl-based compound, a phenylpyrimidine-based compound, a biphenylpyrimidine-based compound, a pyrimidine-based compound, and a biphenyl ethyne-based compound.

The chiral material is used to induce twisting of the liquid crystal composition, align the liquid crystal composition in a helical structure, and make the liquid crystal composition exhibit a blue phase. For the chiral material, a compound which has an asymmetric center, high compatibility with the liquid crystal composition, and strong twisting power is used. In addition, the chiral material is an optically active substance; a higher optical purity is better and the most preferable optical purity is 99% or higher.

In a liquid crystal display device, it is preferable that a polymerizable monomer be added to a liquid crystal composition and polymer stabilization treatment be performed in order to broaden the temperature range within which a blue phase is exhibited. As the polymerizable monomer, for example, a thermopolymerizable (thermosetting) monomer which can be polymerized by heat, a photopolymerizable (photocurable) monomer which can be polymerized by light, or a polymerizable monomer which can be polymerized by heat and light can be used. Further, a polymerization initiator may be added to the liquid crystal composition.

The polymerizable monomer may be a monofunctional monomer such as acrylate or methacrylate; a polyfunctional monomer such as diacrylate, triacrylate, dimethacrylate, or trimethacrylate; or a mixture thereof. Further, the polymerizable monomer may have liquid crystallinity, non-liquid crystallinity, or both of them.

As the polymerization initiator, a radical polymerization initiator which generates radicals by light irradiation, an acid generator which generates an acid by light irradiation, or a base generator which generates a base by light irradiation may be used.

For example, polymer stabilization treatment can be performed in such a manner that a photopolymerizable monomer and a photopolymerization initiator are added to the liquid crystal composition and the liquid crystal composition is irradiated with light having a wavelength at which the photopolymerizable monomer and the photopolymerization initiator react with each other. As the photopolymerizable monomer, typically, a UV polymerizable monomer can be used. When a UV polymerizable monomer is used as a photopolymerizable monomer, the liquid crystal composition may be irradiated with ultraviolet light.

This polymer stabilization treatment may be performed on a liquid crystal composition exhibiting an isotropic phase or a liquid crystal composition exhibiting a blue phase under the control of the temperature. A temperature at which the phase changes from a blue phase to an isotropic phase when the temperature rises, or a temperature at which the phase changes from an isotropic phase to a blue phase when the temperature falls is referred to as the phase transition temperature between a blue phase and an isotropic phase. For example, the polymer stabilization treatment can be performed in the following manner: after a liquid crystal composition to which a photopolymerizable monomer is added is heated to exhibit an isotropic phase, the temperature of the liquid crystal composition is gradually lowered so that the phase changes to a blue phase, and then, light irradiation is performed while the temperature at which a blue phase is exhibited is kept.

With the structure in which a pixel electrode layer and a common electrode layer are provided adjacent to each other between the first substrate 200 and the liquid crystal composition 208, a method can be used in which gradation is controlled by generating an electric field substantially parallel (i.e., in the lateral direction) to a substrate to move liquid crystal molecules in a plane parallel to the substrate. With an electric field formed between the pixel electrode layer and the common electrode layer, liquid crystal is controlled. An electric field in a lateral direction is formed for the liquid crystal, so that liquid crystal molecules can be controlled using the electric field. The liquid crystal composition exhibiting a blue phase is capable of high-speed response. Thus, a high-performance liquid crystal element and a high-performance liquid crystal display device can be achieved. Since the liquid crystal molecules aligned to exhibit a blue phase can be controlled in a direction parallel to the substrate, a wide viewing angle is obtained.

The liquid crystal display device of this embodiment, which is capable of high-speed response, can be favorably used for a successive additive color mixing method (field sequential method) in which light-emitting diodes (LEDs) of RGB or the like are arranged in a backlight unit and color display is performed by time division, or a three-dimensional display method using a shutter glasses system in which images for the right eye and images for the left eye are alternately viewed by time division.

Further, a blue phase is optically isotropic and thus has no viewing angle dependence. Consequently, an alignment film is not necessarily formed; thus, display image quality can be improved and cost can be reduced.

The distance between the pixel electrode layer and the common electrode layer, which are adjacent to each other with the liquid crystal composition 208 interposed therebetween, is a distance at which liquid crystal in the liquid crystal composition 208 between the pixel electrode layer and the common electrode layer responds to predetermined voltage which is applied to the pixel electrode layer and the common electrode layer. The voltage applied is controlled depending on the distance as appropriate.

The maximum thickness (film thickness) of the liquid crystal composition 208 is preferably greater than or equal to 1 µm and less than or equal to 20 µm. The thickness of the liquid crystal composition 208 can be controlled by the spacers 250, 250a, and 250b.

Although not illustrated in FIGS. 1A to 1C, an optical film such as a polarizing plate, a retardation plate, or an anti-reflection film, or the like is provided as appropriate. For example, circular polarization by a polarizing plate and a retardation plate may be used. In addition, a backlight or the like can be used as a light source.

As a liquid crystal display device, a transmissive liquid crystal display device in which display is performed by transmission of light from a light source, a reflective liquid crystal display device in which display is performed by reflection of incident light, or a transflective liquid crystal display device in which a transmissive type and a reflective type are combined can be provided.

In the case of a transmissive liquid crystal display device, an element substrate, a pixel electrode layer, a common electrode layer, a counter substrate, an insulating film, a conductive film, and the like, which are provided in a pixel region through which light is transmitted, preferably have a light-transmitting property with respect to light in the visible wavelength range; however, if an opening pattern is provided, a non-light-transmitting material such as a metal film may be used depending on the shape.

On the other hand, in the case of a reflective liquid crystal display device, a reflective component which reflects light transmitted through a liquid crystal composition (e.g., a reflective film or a reflective substrate) may be provided on the side opposite to the viewing side of the liquid crystal composition. Therefore, a substrate, an insulating film, and a conductive film which are provided between the viewing side and the reflective component and through which light is transmitted have a light-transmitting property with respect to light in the visible wavelength range. Note that in this specification, a light-transmitting property refers to a property of transmitting at least light in the visible wavelength range unless otherwise specified.

The pixel electrode layer and the common electrode layer may be formed using one or more of the following: indium tin oxide, a conductive material in which zinc oxide (ZnO) is mixed into indium oxide, a conductive material in which silicon oxide ($SiO_2$) is mixed into indium oxide, organoindium, organotin, indium oxide containing tungsten oxide, indium zinc oxide containing tungsten oxide, indium oxide containing titanium oxide, indium tin oxide containing titanium oxide, graphene, metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag), alloys thereof, and nitrides thereof.

As the first substrate 200 and the second substrate 201, a glass substrate of barium borosilicate glass, aluminoborosilicate glass, or the like, a quartz substrate, a plastic substrate, or the like can be used. Note that in the case of a reflective liquid crystal display device, a metal substrate such as an aluminum substrate or a stainless steel substrate may be used as the first substrate 200 or the second substrate 201 which is not on the viewing side.

As described above, a liquid crystal display device which is resistant to physical impact and can retain high-quality display characteristics can be provided.

A liquid crystal display device with high reliability and high performance can be provided.

This embodiment can be implemented in appropriate combination with the structures described in the other embodiments.

Embodiment 2

As a liquid crystal display device according to an embodiment of the present invention, a passive matrix liquid crystal display device and an active matrix liquid crystal display device can be provided. In this embodiment, an example of an active matrix liquid crystal display device according to an embodiment of the present invention will be described with reference to FIGS. 2A and 2B and FIGS. 3A and 3B.

Figure 2A:
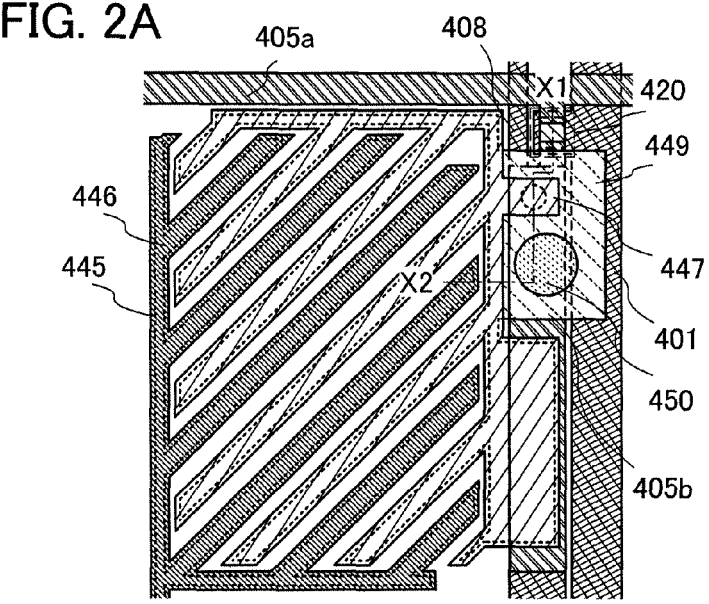
FIGS. 2A and 2B illustrate an embodiment of a liquid crystal display device.
Figure 2B:
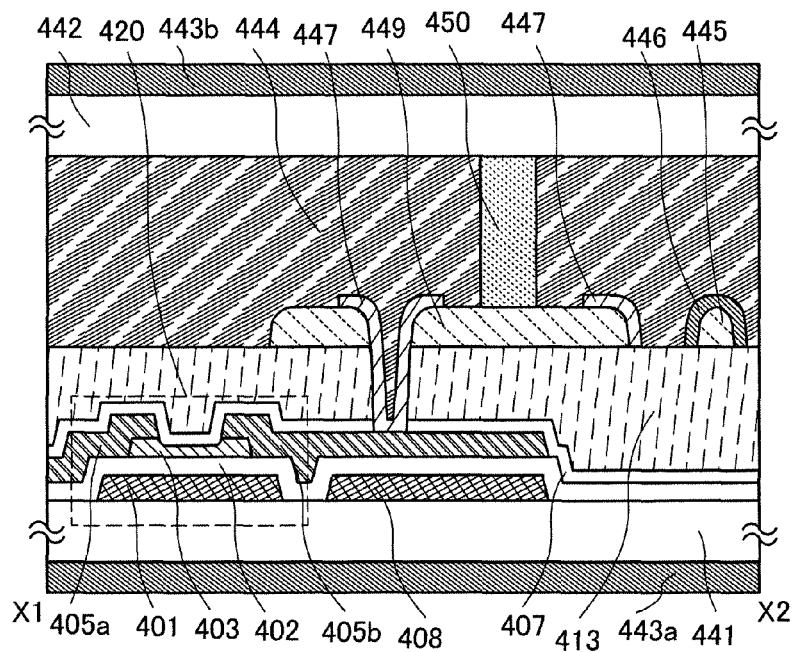

FIG. 2A is a plan view of the liquid crystal display device and illustrates one pixel. FIG. 2B is a cross-sectional view taken along line X1-X2 in FIG. 2A.

In FIG. 2A, a plurality of source wiring layers (including a wiring layer 405a) is arranged so as to be parallel to (extend in the horizontal direction in the drawing) and apart from each other. A plurality of gate wiring layers (including a gate electrode layer 401) is arranged so as to extend in the direction substantially perpendicular to the source wiring layers (in the vertical direction in the drawing) and be apart from each other. Common wiring layers 408 are provided adjacent to the respective plurality of gate wiring layers and extend in the direction substantially parallel to the gate wiring layers, that is, in the direction substantially perpendicular to the source wiring layers (in the vertical direction in the drawing). A roughly rectangular space is surrounded by the source wiring layers, the common wiring layer 408, and the gate wiring layer. A pixel electrode layer and a common electrode layer of the liquid crystal display device are provided in this space. A transistor 420 for driving the pixel electrode layer is provided at an upper right corner of the drawing. A plurality of pixel electrode layers and a plurality of transistors are arranged in matrix.

In the liquid crystal display device in FIGS. 2A and 2B, a first electrode layer 447 which is electrically connected to the transistor 420 serves as a pixel electrode layer, while a second electrode layer 446 which is electrically connected to the common electrode layer 408 serves as a common electrode layer although the connection structure is not illustrated in FIGS. 2A and 2B. Note that a capacitor is formed by the first electrode layer 447, a wiring layer 405b, the common wiring layer 408, and a gate insulating layer 402. Although the common electrode layer can operate in a floating state (electrically isolated state), the potential of the common electrode layer may be set to a fixed potential, preferably to a potential around an intermediate potential of an image signal which is transmitted as data at such a level as not to generate flickers.

Note that a common electrode layer may additionally be provided on a counter substrate (second substrate 442) side. In this case, the common electrode layer (second electrode layer 446) provided on an element substrate (first substrate 441) side and the common electrode layer provided on the counter substrate (second substrate 442) side preferably have the same potential.

A method can be used in which gradation is controlled by generating an electric field substantially parallel (i.e., in the lateral direction) to a substrate to move liquid crystal molecules in a plane parallel to the substrate. For such a method, electrode structures used in an IPS mode as illustrated in FIGS. 2A and 2B and FIGS. 3A and 3B can be employed.

In a lateral electric field mode such as an IPS mode, the first electrode layer 447 (e.g., a pixel electrode layer with which voltage is controlled in each pixel) and the second electrode layer 446 (e.g., a common electrode layer with which common voltage is applied to all pixels), each of which has an opening pattern, are located over the first substrate 441 below the liquid crystal composition 444. The first electrode layer 447 and the second electrode layer 446 have not a flat shape but various opening patterns including a bent portion or a branched comb-like portion. An arrangement of the first electrode layer 447 and the second electrode layer 446, which complies with both conditions that they have the same shape and they completely overlap with each other, is avoided in order to generate an electric field between the electrodes.

Figure 3A:
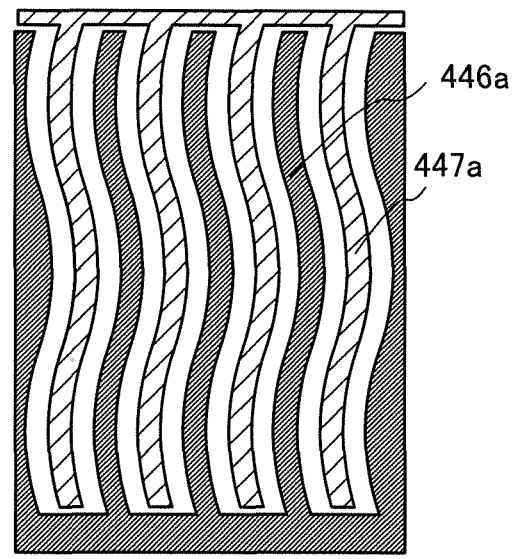
FIGS. 3A and 3B each illustrate an embodiment of an electrode structure of a liquid crystal display device.
Figure 3B:
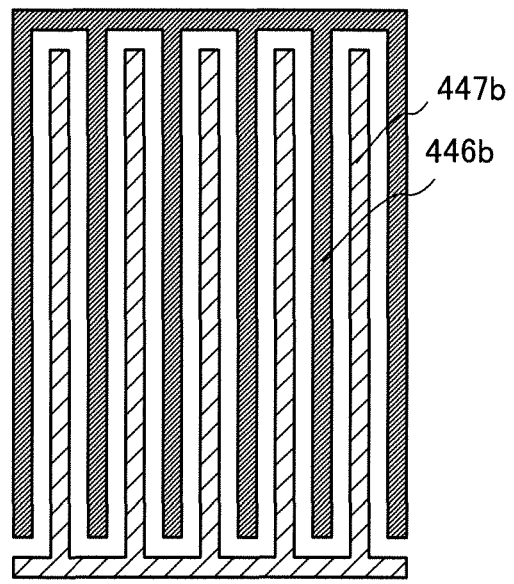

Each of FIGS. 3A and 3B is another example of the first electrode layer 447 and the second electrode layer 446. In a top view of FIG. 3A, a first electrode layer 447a and a second electrode layer 446a are formed to be engaged with each other. In a top view of FIG. 3B, a first electrode layer 447b and a second electrode layer 446b are formed to be engaged with each other. The first electrode layer 447a and the second electrode layer 446a in FIG. 3A each have a wavelike shape and are engaged with each other. The first electrode layer 447b and the second electrode layer 446b in FIG. 3B each have a comb-like shape and are engaged with each other.

Since the first electrode layer 447 and the second electrode layer 446 have an opening pattern, they are illustrated as divided plural electrode layers in the cross-sectional view of FIG. 2B. This is the same as in the other drawings of this specification.

The first electrode layer 447 which is a pixel electrode layer is formed over a first structure body 449 projecting into the liquid crystal composition 444 from a surface of an interlayer film 413 on the liquid crystal composition 444 side over the first substrate 441 (also referred to as an element substrate), and the second electrode layer 446 is formed over a second structure body 445 projecting into the liquid crystal composition 444 from the surface of the interlayer film 413 on the liquid crystal composition 444 side over the first substrate 441.

The first structure body 449 and the second structure body 445 are each an example of a rib-shaped electrode. The shapes of the first structure body 449 and the second structure body 445 are determined by the shapes of the first electrode layer 447 and the second electrode layer 446, which are formed thereover, and the first structure body 449 and the second structure body 445 each have an opening pattern and a shape including a bend portion or a branching comb-like shape.

Figure 5A:
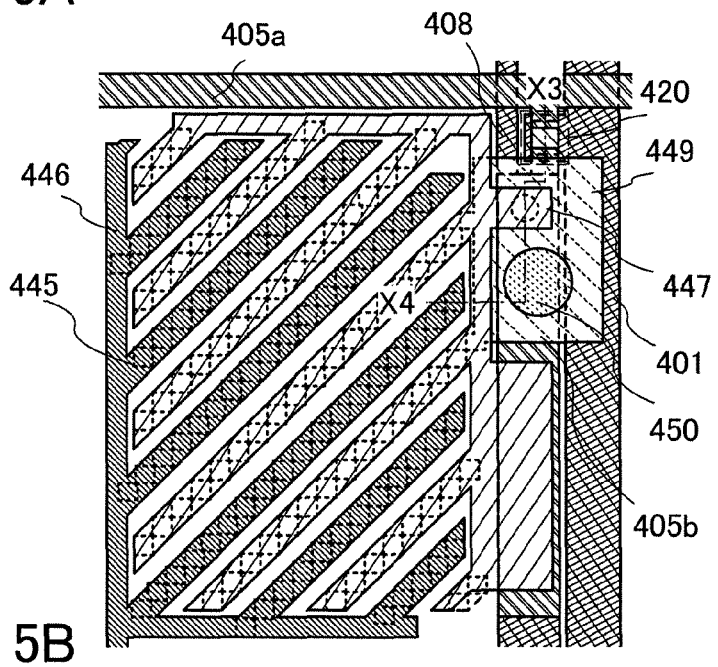
FIGS. 5A and 5B illustrate an embodiment of a structure of a spacer of a liquid crystal display device.
Figure 5B:
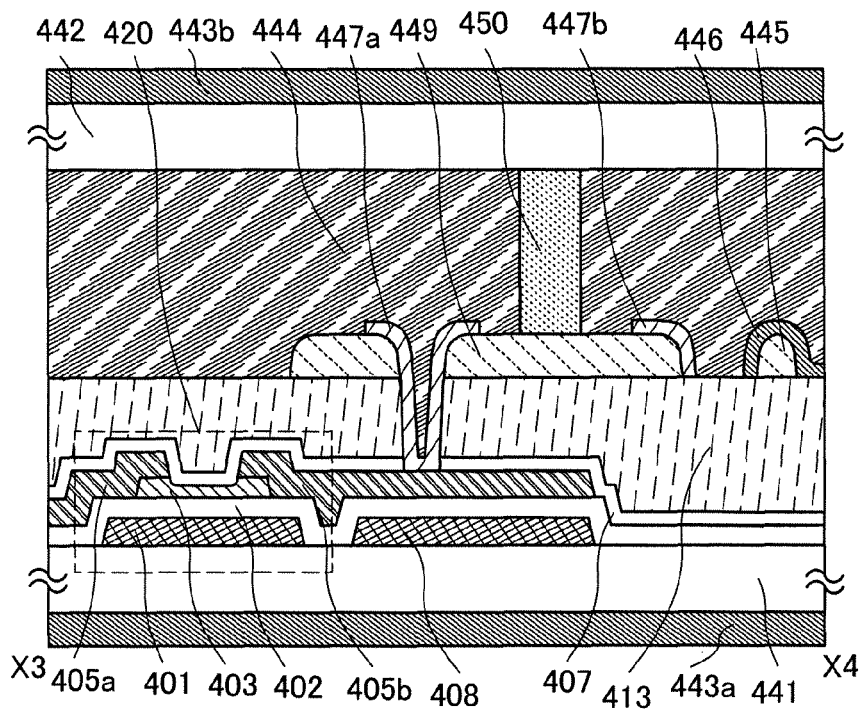

Alternatively, as illustrated in FIGS. 5A and 5B, the first structure body 449 and the second structure body 445 may each include quadrangular pyramids arranged in a row. In this embodiment, a polarizing plate 443a has a polarization axis along a first direction and a polarizing plate 443b has a polarization axis along a second direction. In this specification, a polarization axis refers to the vibration direction of linearly polarized light produced by conversion of light which has passed through a polarizer such as a polarizing plate.

The interface between a side surface of the first structure body 449 and the first electrode layer 447 and the interface between a side surface of the second structure body 445 and the second electrode layer 446 are provided to be parallel to the first direction or the second direction, and the first electrode layer 447 and the second electrode layer 446 are provided so that a direction of an electric field generated in the liquid crystal composition 444 between the first electrode layer 447 and the second electrode layer 446 is a third direction which equally divides the angle formed by the first direction and the second direction.

With the structure illustrated in FIGS. 5A and 5B, a liquid crystal display device in which light leakage in a pixel where black display is performed is reduced and the contrast ratio is improved can be provided.

The first electrode layer 447 is provided so as to cover a top surface and the side surface of the first structure body 449 and the second electrode layer 446 is provided so as to cover a top surface and the side surface of the second structure body 445, whereby the formation area of the first electrode layer 447 and the second electrode layer 446 can be increased in a thickness direction (three-dimensionally) of the liquid crystal composition 444. Accordingly, when voltage is applied between the first electrode layer 447 and the second electrode layer 446, an electric field can be widely formed between the first electrode layer 447 and the second electrode layer 446.

Therefore, the liquid crystal molecules in the entire liquid crystal composition including a thickness direction can be made to respond and white transmittance of the liquid crystal display device can be improved. Accordingly, contrast ratio, which is a ratio of white transmittance to black transmittance, can also be increased.

A spacer 450 is provided to control the thickness (cell gap) of the liquid crystal composition 444. In the liquid crystal display device including the liquid crystal composition 444, the cell gap which is the thickness of the liquid crystal composition 444 is preferably greater than or equal to 1 µm and less than or equal to 20 µm. In this specification, the thickness of a cell gap refers to a maximum thickness (film thickness) of a liquid crystal composition.

A spacer can be formed over the first structure body 449 and/or the second structure body 445. In this embodiment, the spacer 450 is provided over the first structure body 449 and the first electrode layer 447 which is a pixel electrode layer is provided adjacent to the spacer 450 over the same surface of the first structure body 449.

Thus, when the first structure body 449 is provided to extend to a region where the spacer 450 is to be formed, since the first structure body 449 is formed using one continuous film, regions of the surface of the first structure body 449 have substantially the same height and the spacer 450 can be stably provided with good adhesion.

Further, by widely providing the first structure body 449 to reach a region where the spacer 450 is to be formed, when the spacer 450 provided for a counter substrate is placed on an element substrate side, a region where the spacer 450 can be stably placed can be wide. Note that the spacer 450 is placed over a surface at the same height as the upper surface (the most projecting surface) of the first structure body 449; therefore, even if the spacer 450 provided for the counter substrate is moved to align on the element substrate side, the adjacent first structure body 449 and the adjacent second structure body 445 are not damaged.

Accordingly, defects in an arrangement step of the spacer 450, due to misalignment of the spacer 450, or the like can be reduced, leading to improvement in a yield.

The spacer 450 can be stably provided in a substantially flat region with less steep unevenness and fewer steep steps in the liquid crystal display device; thus, damage and a shape defect of the spacer 450 due to physical impact can be reduced and the liquid crystal display device can have high resistance to physical impact.

Accordingly, a liquid crystal display device which is resistant to physical impact and can retain high-quality display characteristics can be provided. Further, a liquid crystal display device with high reliability and high performance can be provided.

In this embodiment, a liquid crystal composition including nematic liquid crystal, a chiral material, a polymerizable monomer, and a polymerization initiator and exhibiting a blue phase is used as the liquid crystal composition 444. The liquid crystal composition 444 is provided in a liquid crystal display device with a blue phase exhibited (with a blue phase shown) by polymer stabilization treatment. The liquid crystal composition 444 further includes a high molecular compound.

The transistor 420 is an inverted staggered thin film transistor formed over the first substrate 441 having an insulating surface. The transistor 420 includes the gate electrode layer 401, the gate insulating layer 402, a semiconductor layer 403, and the wiring layers 405a and 405b which function as a source electrode layer and a drain electrode layer.

There is no particular limitation on the structure of a transistor which can be used for the liquid crystal display device disclosed in this specification. For example, a staggered type or a planar type having a top-gate structure or a bottom-gate structure can be employed. The transistor may have a single-gate structure in which one channel formation region is formed, a double-gate structure in which two channel formation regions are formed, or a triple-gate structure in which three channel formation regions are formed. Alternatively, the transistor may have a dual gate structure including two gate electrode layers positioned over and below a channel region with a gate insulating layer provided therebetween.

An insulating film 407 which is in contact with the semiconductor layer 403 is provided to cover the transistor 420. The interlayer film 413 is stacked over the insulating film 407.

There is no particular limitation on the method for forming the interlayer film 413, and the following method can be employed depending on the material: spin coating, dip coating, spray coating, a droplet discharging method (inkjet method), screen printing, offset printing, roll coating, curtain coating, knife coating, or the like.

The first substrate 441 and the second substrate 442 which is a counter substrate are firmly attached to each other with a sealant with the liquid crystal composition 444 provided therebetween. The liquid crystal composition 444 can be formed by a dispenser method (dropping method), or an injection method by which liquid crystal is injected using capillary action or the like after the first substrate 441 is attached to the second substrate 442.

As the sealant, typically, a visible light curable resin, a UV curable resin, or a thermosetting resin is preferably used. Typically, an acrylic resin, an epoxy resin, an amine resin, or the like can be used. Further, a photopolymerization initiator (typically, a UV polymerization initiator), a thermosetting agent, a filler, or a coupling agent may be included in the sealant.

In the case where a photocurable resin such as a UV curable resin is used as a sealant and a liquid crystal composition is formed by a dropping method, for example, the sealant may be cured in the light irradiation step of the polymer stabilization treatment.

In this embodiment, the polarizing plate 443a is provided on the outer side (on the side opposite to the liquid crystal composition 444) of the first substrate 441, and the polarizing plate 443b is provided on the outer side (on the side opposite to the liquid crystal composition 444) of the second substrate 442. In addition to the polarizing plates, an optical film such as a retardation plate or an anti-reflection film may be provided. For example, circular polarization by a polarizing plate and a retardation plate may be used. Through the above-described process, a liquid crystal display device can be completed.

In the case of manufacturing a plurality of liquid crystal display devices using a large-sized substrate (a so-called multiple panel method), a division step can be performed before the polymer stabilization treatment or before provision of the polarizing plates. In consideration of the influence of the division step on the liquid crystal composition (such as alignment disorder due to force applied in the division step), it is preferable that the division step be performed after attaching the first substrate and the second substrate to each other before performing the polymer stabilization treatment.

Although not illustrated, a backlight, a sidelight, or the like may be used as a light source. Light from the light source is emitted from the side of the first substrate 441 which is an element substrate so as to pass through the second substrate 442 on the viewing side.

The first electrode layer 447 and the second electrode layer 446 can be formed using a light-transmitting conductive material such as indium oxide containing tungsten oxide, indium zinc oxide containing tungsten oxide, indium oxide containing titanium oxide, indium tin oxide containing titanium oxide, indium tin oxide, indium zinc oxide, indium tin oxide to which silicon oxide is added, or graphene.

Alternatively, the first electrode layer 447 and the second electrode layer 446 can be formed using one or more materials selected from metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy of any of these metals; and a nitride of any of these metals.

The first electrode layer 447 and the second electrode layer 446 can be formed using a conductive composition including a conductive high molecule (also referred to as a conductive polymer). The pixel electrode formed using a conductive composition preferably has a sheet resistance of less than or equal to 10000 ohms per square and a transmittance of greater than or equal to 70% at a wavelength of 550 nm. Further, the resistivity of the conductive high molecule included in the conductive composition is preferably less than or equal to 0.1 Ω·cm.

As the conductive high molecule, a so-called π-electron conjugated conductive polymer can be used. For example, polyaniline or a derivative thereof, polypyrrole or a derivative thereof, polythiophene or a derivative thereof, a copolymer of two or more of aniline, pyrrole, and thiophene or a derivative thereof can be given.

An insulating film serving as a base film may be provided between the first substrate 441 and the gate electrode layer 401. The base film has a function of preventing diffusion of an impurity element from the first substrate 441, and can be formed to have a single-layer structure or a stacked-layer structure using one or more of a silicon nitride film, a silicon oxide film, a silicon nitride oxide film, a silicon oxynitride film, and an aluminum oxide film. The gate electrode layer 401 and the common wiring layer 408 can be formed to have a single-layer or stacked-layer structure using any of metal materials such as molybdenum, titanium, chromium, tantalum, tungsten, aluminum, copper, neodymium, and scandium, and an alloy material which contains any of these materials as its main component. Alternatively, a semiconductor film typified by a polycrystalline silicon film doped with an impurity element such as phosphorus, or a silicide film such as a nickel silicide film may be used as the gate electrode layer 401 and the common wiring layer 408.

The gate electrode layer 401 and the common wiring layer 408 can also be formed using a conductive material such as indium oxide-tin oxide, indium oxide containing tungsten oxide, indium zinc oxide containing tungsten oxide, indium oxide containing titanium oxide, indium tin oxide containing titanium oxide, indium oxide-zinc oxide, or indium tin oxide to which silicon oxide is added. It is also possible that the gate electrode layer 401 and the common wiring layer 408 have a stacked structure of the above conductive material and the above metal material.

As the gate electrode layer 401 and the common wiring layer 408, a metal oxide film containing nitrogen, specifically, an In—Ga—Zn—O film containing nitrogen, an In—Sn—O film containing nitrogen, an In—Ga—O film containing nitrogen, an In—Zn—O film containing nitrogen, a Sn—O film containing nitrogen, an In—O film containing nitrogen, or a metal nitride (e.g., InN or SnN) film can be used.

For example, as a two-layer structure of the gate electrode layer 401 and the common wiring layer 408, any of the following structures is preferable: a two-layer structure in which a molybdenum layer is stacked over an aluminum layer, a two-layer structure in which a molybdenum layer is stacked over a copper layer, a two-layer structure in which a titanium nitride layer or a tantalum nitride layer is stacked over a copper layer, and a two-layer structure of a titanium nitride layer and a molybdenum layer. As a three-layer structure, a stacked-layer structure in which a tungsten layer or a tungsten nitride layer, an alloy layer of aluminum and silicon or an alloy layer of aluminum and titanium, and a titanium nitride layer or a titanium layer are stacked is preferable.

The gate insulating layer 402 can be formed by a plasma CVD method, a sputtering method, or the like with the use of a silicon oxide film, a gallium oxide film, an aluminum oxide film, a silicon nitride film, a silicon oxynitride film, an aluminum oxynitride film, a silicon nitride oxide film, or the like. Alternatively, a high-k material such as hafnium oxide, yttrium oxide, lanthanum oxide, hafnium silicate (HfSi$_x$O$_y$ (x>0, y>0)), hafnium aluminate (HfAl$_x$O$_y$ (x>0, y>0)), hafnium silicate to which nitrogen is added, or hafnium aluminate to which nitrogen is added may be used as a material for the gate insulating layer 402. The use of such a high-k material enables a reduction in gate leakage current.

Alternatively, the gate insulating layer 402 can be formed using a silicon oxide layer by a CVD method in which an organosilane gas is used. As an organosilane gas, a silicon-containing compound such as tetraethoxysilane (TEOS) (chemical formula: Si(OC$_2$H$_5$)$_4$), tetramethylsilane (TMS) (chemical formula: Si(CH$_3$)$_4$), tetramethylcyclotetrasiloxane (TMCTS), octamethylcyclotetrasiloxane (OMCTS), hexamethyldisilazane (HMDS), triethoxysilane (SiH(OC$_2$H$_5$)$_3$), or trisdimethylaminosilane (SiH(N(CH$_3$)$_2$)$_3$) can be used. Note that the gate insulating layer 402 may have a single layer structure or a stacked-layer structure.

A material of the semiconductor layer 403 is not limited to a particular material and may be determined in accordance with characteristics needed for the transistor 420, as appropriate. Examples of a material which can be used for the semiconductor layer 403 will be described.

The semiconductor layer 403 can be formed using the following material: an amorphous semiconductor formed by a chemical vapor deposition method using a semiconductor source gas typified by silane or germane or by a physical vapor deposition method such as a sputtering method; a polycrystalline semiconductor formed by crystallizing the amorphous semiconductor with the use of light energy or thermal energy; a microcrystalline semiconductor in which a minute crystalline phase and an amorphous phase coexist; or the like. The semiconductor layer can be formed by a sputtering method, an LPCVD method, a plasma CVD method, or the like.

A typical example of an amorphous semiconductor is hydrogenated amorphous silicon, while a typical example of a crystalline semiconductor is polysilicon. Examples of polysilicon (polycrystalline silicon) are as follows: so-called high-temperature polysilicon which contains polysilicon formed at a process temperature of 800° C. or higher as its main component, so-called low-temperature polysilicon which contains polysilicon formed at a process temperature of 600° C. or lower as its main component, and polysilicon obtained by crystallizing amorphous silicon with the use of an element that promotes crystallization, or the like. It is needless to say that a microcrystalline semiconductor or a semiconductor partly containing a crystal phase can be used as described above.

An oxide semiconductor film may also be used as the semiconductor layer 403. The oxide semiconductor preferably contains at least indium (In), particularly In and zinc (Zn). In addition, as a stabilizer for reducing the variation in electric characteristics of transistors using the oxide semiconductor, gallium (Ga) is preferably contained in addition to In and Zn. Tin (Sn) is preferably contained as a stabilizer. Hafnium (Hf) is preferably contained as a stabilizer. Aluminum (Al) is preferably contained as a stabilizer. Zirconium (Zr) is preferably contained as a stabilizer.

As another stabilizer, one or plural kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu) may be contained.

As the oxide semiconductor, for example, any of the following can be used: indium oxide, tin oxide, zinc oxide, a two-component metal oxide such as an In—Zn-based oxide, an In—Mg-based oxide, or an In—Ga-based oxide, a three-component metal oxide such as an In—Ga—Zn-based oxide (also referred to as IGZO), an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide, or a four-component metal oxide such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide.

Note that here, for example, an "In—Ga—Zn-based oxide" means an oxide containing In, Ga, and Zn as its main component and there is no particular limitation on the ratio of In:Ga:Zn. The In—Ga—Zn-based oxide may contain a metal element other than In, Ga, and Zn.

Alternatively, a material represented by $InMO_3(ZnO)_m$ (m>0, m is not an integer) may be used as the oxide semiconductor. Note that M represents one or more metal elements selected from Ga, Fe, Mn, and Co. Alternatively, as the oxide semiconductor, a material represented by $In_2SnO_5(ZnO)_n$ (n>0, n is an integer) may be used.

For example, an In—Ga—Zn-based oxide with an atomic ratio of In:Ga:Zn=1:1:1 (=1/3:1/3:1/3), In:Ga:Zn=2:2:1 (=2/5:2/5:1/5), or In:Ga:Zn=3:1:2 (=1/2:1/6:1/3), or an oxide with an atomic ratio close to the above atomic ratios can be used. Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8), or an oxide with an atomic ratio close to the above atomic ratios may be used.

However, without limitation to the materials given above, a material with an appropriate composition may be used as the oxide semiconductor depending on necessary semiconductor characteristics (e.g., mobility, threshold voltage, and variation). In order to obtain necessary semiconductor characteristics, it is preferable that the carrier density, the impurity concentration, the defect density, the atomic ratio between a metal element and oxygen, the interatomic distance, the density, and the like be set to appropriate values.

For example, high mobility can be obtained relatively easily in the case of using an In—Sn—Zn-based oxide. However, mobility can be increased by reducing the defect density in a bulk also in the case of using an In—Ga—Zn-based oxide.

Note that, for example, the expression "the composition of an oxide containing In, Ga, and Zn at an atomic ratio of In:Ga:Zn=a:b:c (a+b+c=1) is close to the composition of an oxide containing In, Ga, and Zn at an atomic ratio of In:Ga:Zn=A:B:C (A+B+C=1)" means that a, b, and c satisfy the following relation: $(a-A)^2+(b-B)^2+(c-C)^2 \leq r^2$, and r may be 0.05, for example. The same applies to other oxides.

An oxide semiconductor film is in a single crystal state, a polycrystalline (also referred to as polycrystal) state, an amorphous state, or the like.

The oxide semiconductor film is preferably a CAAC-OS (c-axis aligned crystalline oxide semiconductor) film.

The CAAC-OS film is not completely single crystal nor completely amorphous. The CAAC-OS film is an oxide semiconductor film with a crystal-amorphous mixed phase structure where crystal portions are included in an amorphous phase. Note that in most cases, the crystal portion fits inside a cube whose one side is less than 100 nm. From an observation image obtained with a transmission electron microscope (TEM), a boundary between an amorphous portion and a crystal portion in the CAAC-OS film is not clear. Further, with the TEM, a grain boundary in the CAAC-OS film is not found. Thus, in the CAAC-OS film, a reduction in electron mobility, due to the grain boundary, is suppressed.

In each of the crystal portions included in the CAAC-OS film, a c-axis is aligned in a direction parallel to a normal vector of a surface where the CAAC-OS film is formed or a normal vector of a surface of the CAAC-OS film, triangular or hexagonal atomic arrangement which is seen from the direction perpendicular to the a-b plane is formed, and metal atoms are arranged in a layered manner or metal atoms and oxygen atoms are arranged in a layered manner when seen from the direction perpendicular to the c-axis. Note that, among crystal portions, the directions of the a-axis and the b-axis of one crystal portion may be different from those of another crystal portion. In this specification, a simple term "perpendicular" includes a range from 85° to 95°. In addition, a simple term "parallel" includes a range from −5° to 5°.

In the CAAC-OS film, distribution of crystal portions is not necessarily uniform. For example, in the formation process of the CAAC-OS film, in the case where crystal growth occurs from a surface side of the oxide semiconductor film, the proportion of crystal portions in the vicinity of the surface of the oxide semiconductor film is higher than that in the vicinity of the surface where the oxide semiconductor film is formed in some cases. Further, when an impurity is added to the CAAC-OS film, the crystal portion in a region to which the impurity is added becomes amorphous in some cases.

Since the c-axes of the crystal portions included in the CAAC-OS film are aligned in the direction parallel to a normal vector of a surface where the CAAC-OS film is formed or a normal vector of a surface of the CAAC-OS film, the directions of the c-axes may be different from each other depending on the shape of the CAAC-OS film (the cross-sectional shape of the surface where the CAAC-OS film is formed or the cross-sectional shape of the surface of the CAAC-OS film). Note that when the CAAC-OS film is formed, the direction of c-axis of the crystal portion is the direction parallel to a normal vector of the surface where the CAAC-OS film is formed or a normal vector of the surface of the CAAC-OS film. The crystal portion is formed by film formation or by performing treatment for crystallization such as heat treatment after film formation.

With the use of the CAAC-OS film in a transistor, change in electric characteristics of the transistor due to irradiation with visible light or ultraviolet light is small. Thus, the transistor has high reliability.

Note that part of oxygen included in the oxide semiconductor film may be substituted with nitrogen.

In an oxide semiconductor having a crystal portion such as the CAAC-OS, defects in the bulk can be further reduced and when the surface flatness of the oxide semiconductor is improved, mobility higher than that of an oxide semiconductor in an amorphous state can be obtained. In order to improve the surface flatness, the oxide semiconductor is preferably formed over a flat surface. Specifically, the oxide semiconductor may be formed over a surface with the average surface roughness (Ra) of less than or equal to 1 nm, preferably less than or equal to 0.3 nm, more preferably less than or equal to 0.1 nm.

In a process of forming the semiconductor layer and the wiring layer, an etching step is used to process thin films into desired shapes. Dry etching or wet etching can be used for the etching step.

The etching conditions (such as an etchant, etching time, and temperature) are adjusted as appropriate depending on the material so that the material can be etched to have a desired shape.

As a material of the wiring layers 405a and 405b serving as a source electrode layer and a drain electrode layer, an element selected from Al, Cr, Ta, Ti, Mo, and W, an alloy containing any of the above elements as its component, an alloy film containing a combination of any of these elements, and the like can be given. Further, in the case where heat treatment is performed, the conductive film preferably has heat resistance against the heat treatment. Since use of Al alone brings disadvantages such as low heat resistance and a tendency to corrosion, aluminum is used in combination with a conductive material having heat resistance. As the conductive material having heat resistance, which is combined with aluminum, it is possible to use an element selected from titanium (Ti), tantalum (Ta), tungsten (W), molybdenum (Mo), chromium (Cr), neodymium (Nd), and scandium (Sc); an alloy containing any of these elements as its component; an alloy containing a combination of any of these elements; or a nitride containing any of these elements as its component.

The gate insulating layer 402, the semiconductor layer 403, and the wiring layers 405a and 405b serving as a source electrode layer and a drain electrode layer may be successively formed without being exposed to air. Successive film formation without exposure to air makes it possible to obtain each interface between stacked layers, which is not contaminated by atmospheric components or impurity elements in the air. Thus, variation in characteristics of the transistors can be reduced.

Note that the semiconductor layer 403 is partly etched so as to have a groove (depressed portion).

An inorganic insulating film or an organic insulating film formed by a dry method or a wet method can be used as the insulating film 407 which covers the transistor 420 and the interlayer film 413. For example, it is possible to use a silicon nitride film, a silicon oxide film, a silicon oxynitride film, an aluminum oxide film, or a tantalum oxide film, which is formed by a CVD method, a sputtering method, or the like. Alternatively, an organic material such as polyimide, acrylic, a benzocyclobutene-based resin, polyamide, or epoxy can be used. As an alternative to such organic materials, it is possible to use a low-dielectric constant material (low-k material), a siloxane-based resin, phosphosilicate glass (PSG), borophosphosilicate glass (BPSG), or the like. A gallium oxide film can also be used as the insulating film 407.

Note that the siloxane-based resin corresponds to a resin including a Si—O—Si bond formed using a siloxane-based material as a starting material. The siloxane-based resin may include an organic group (e.g., an alkyl group or an aryl group) or a fluoro group as a substituent. Moreover, the organic group may include a fluoro group. A siloxane-based resin is applied by a coating method and baked; thus, the insulating film 407 can be formed.

Alternatively, the insulating film 407 and the interlayer film 413 may each be formed by stacking a plurality of insulating films formed using any of these materials. For example, a structure may be employed in which an organic resin film is stacked over an inorganic insulating film.

Further, with the use of a resist mask having regions with plural thicknesses (typically, two different thicknesses) which is formed using a multi-tone mask, the number of steps in a photolithography process can be reduced, resulting in a simplified process and lower cost.

As described above, a liquid crystal display device which is resistant to physical impact and can retain high-quality display characteristics can be provided.

A liquid crystal display device with high reliability and high performance can be provided.

This embodiment can be implemented in appropriate combination with the structures described in the other embodiments.

Embodiment 3

A transistor is manufactured, and a liquid crystal display device having a display function can be manufactured using the transistor in a pixel portion and further in a driver circuit. Further, part or the whole of the driver circuit can be formed over the same substrate as the pixel portion, using the transistor, whereby a system-on-panel can be obtained.

The liquid crystal display device includes a liquid crystal element (also referred to as a liquid crystal display element) as a display element.

Further, a liquid crystal display device includes a panel in which a display element is sealed, and a module in which an IC or the like including a controller is mounted to the panel. An embodiment of the present invention also relates to an element substrate, which corresponds to one mode before the display element is completed in a manufacturing process of the liquid crystal display device, and the element substrate is provided with means for supplying current to the display element in each of a plurality of pixels. Specifically, the element substrate may be in a state in which only a pixel electrode of the display element is formed, a state in which a conductive film to be a pixel electrode is formed but is not etched yet to form the pixel electrode, or in any other states.

Note that a liquid crystal display device in this specification means an image display device, a display device, or a light source (including a lighting device). Further, a liquid crystal display device also refers to all the following modules: a module to which a connector, for example, a flexible printed circuit (FPC), a tape automated bonding (TAB) tape, or a tape carrier package (TCP) is attached, a module in which a printed wiring board is provided at an end of a TAB tape or a TCP, and a module in which an integrated circuit (IC) is directly mounted on a display element by a chip on glass (COG) method.

Figure 4B:
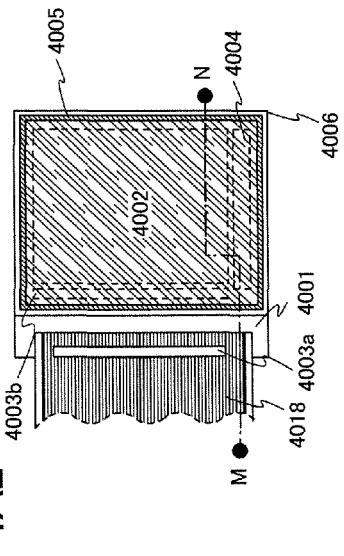
Figure 4B:
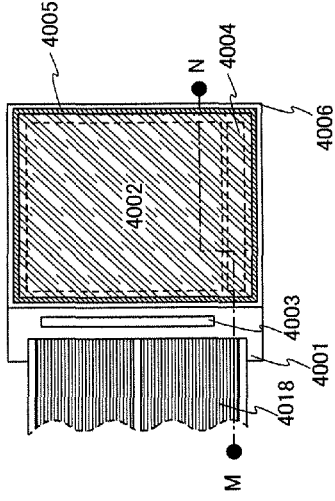
Figure 4B:
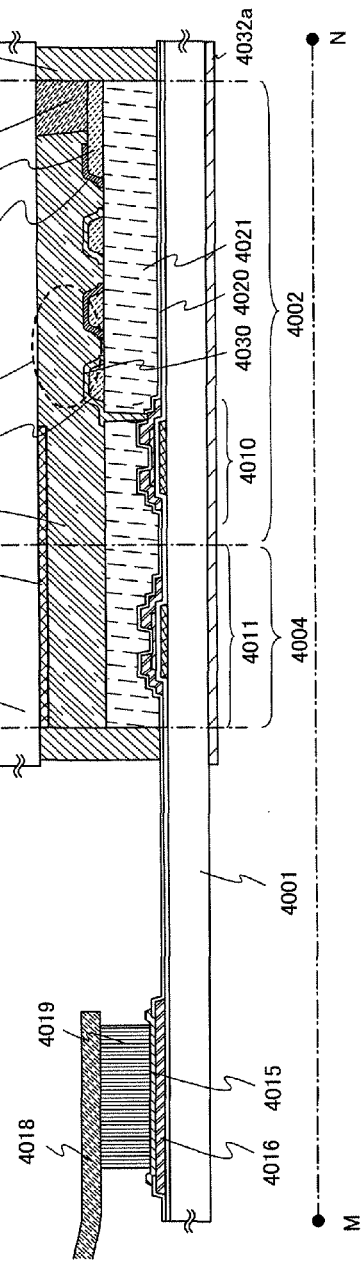

The appearance and a cross section of a liquid crystal display panel which corresponds to a liquid crystal display device of an embodiment of the present invention is described with reference to FIGS. 4A1, 4A2, and 4B. FIGS. 4A1 and 4A2 are each a top view of a panel in which transistors 4010 and 4011 formed over a first substrate 4001 and a liquid crystal element 4013 are sealed between the first substrate 4001 and a second substrate 4006 with a sealant 4005. FIG. 4B is a cross-sectional view taken along line M-N of FIGS. 4A1 and 4A2.

The sealant 4005 is provided so as to surround a pixel portion 4002 and a scan line driver circuit 4004 which are provided over the first substrate 4001. The second substrate 4006 is provided over the pixel portion 4002 and the scan line driver circuit 4004. Thus, the pixel portion 4002 and the scan line driver circuit 4004 are sealed together with a liquid crystal composition 4008 by the first substrate 4001, the sealant 4005, and the second substrate 4006.

In FIG. 4A1, a signal line driver circuit 4003 that is formed using a single crystal semiconductor film or a polycrystalline semiconductor film over a substrate separately prepared is mounted in a region that is different from the region surrounded by the sealant 4005 over the first substrate 4001. FIG. 4A2 illustrates an example in which part of a signal line driver circuit is formed with the use of a transistor which is provided over the first substrate 4001. A signal line driver circuit 4003b is formed over the first substrate 4001, and a signal line driver circuit 4003a that is formed using a single crystal semiconductor film or a polycrystalline semiconductor film over a substrate separately prepared is mounted.

Note that the connection method of a driver circuit which is separately formed is not particularly limited, and a COG method, a wire bonding method, a TAB method, or the like can be used. FIG. 4A1 illustrates an example of mounting the signal line driver circuit 4003 by a COG method, and FIG. 4A2 illustrates an example of mounting the signal line driver circuit 4003a by a TAB method.

The pixel portion 4002 and the scan line driver circuit 4004 provided over the first substrate 4001 include a plurality of transistors. FIG. 4B illustrates the transistor 4010 included in the pixel portion 4002 and the transistor 4011 included in the scan line driver circuit 4004, as an example. An insulating layer 4020 and an interlayer film 4021 are provided over the transistors 4010 and 4011.

The transistor which is described in Embodiment 2 can be used as the transistors 4010 and 4011.

Further, a conductive layer may be provided over the interlayer film 4021 or the insulating layer 4020 so as to overlap with a channel formation region of a semiconductor layer of the transistor 4011 for the driver circuit. The conductive layer may have the same potential as or a potential different from that of a gate electrode layer of the transistor 4011 and can function as a second gate electrode layer. Further, the potential of the conductive layer may be GND or the conductive layer may be in a floating state.

In addition, a pixel electrode layer 4030 is formed over a first structure body 4037 which is provided over the interlayer film 4021 to project into the liquid crystal composition 4008 and the pixel electrode layer 4030 is electrically connected to the transistor 4010. Over the interlayer film 4021, a common electrode layer 4031 is provided over a second structure body 4038 which is provided to project into the liquid crystal composition 4008. The liquid crystal element 4013 includes the pixel electrode layer 4030, the common electrode layer 4031, and the liquid crystal composition 4008. Note that a polarizing plate 4032a and a polarizing plate 4032b are provided on the outer sides of the first substrate 4001 and the second substrate 4006, respectively.

In this embodiment, a liquid crystal composition including nematic liquid crystal, a chiral material, a polymerizable monomer, and a polymerization initiator and exhibiting a blue phase is used as the liquid crystal composition 4008. The liquid crystal composition 4008 is provided in the liquid crystal display device with a blue phase exhibited (with a blue phase shown) by being subjected to polymer stabilization treatment. The liquid crystal composition 4008 further includes an organic compound.

The structures of the pixel electrode layer and the common electrode layer described in Embodiment 2 can be used for the pixel electrode layer 4030 and the common electrode layer 4031. The pixel electrode layer 4030 and the common electrode layer 4031 have opening patterns.

With the pixel electrode layer 4030 which is provided so as to cover a top surface and a side surface of the first structure body 4037 and the common electrode layer 4031 which is provided so as to cover a top surface and a side surface of the second structure body 4038, an electric field can be widely formed between the pixel electrode layer 4030 and the common electrode layer 4031 in the liquid crystal composition 4008.

Therefore, the liquid crystal molecules in the entire liquid crystal composition including a thickness direction can be made to respond and white transmittance can be improved. Accordingly, contrast ratio, which is a ratio of white transmittance to black transmittance, can also be increased.

A spacer 4035 is provided to control the thickness (cell gap) of the liquid crystal composition 4008. In the liquid crystal display device including the liquid crystal composition 4008, the cell gap which is the thickness of the liquid crystal composition is preferably greater than or equal to 1 μm and less than or equal to 20 μm. In this specification, the thickness of a cell gap refers to a maximum thickness (film thickness) of a liquid crystal composition.

The spacer 4035 can be formed over the first structure body and/or the second structure body. In this embodiment, the spacer 4035 is provided over the second structure body 4038 and the common electrode layer 4031 is provided adjacent to the spacer 4035 over the same surface of the second structure body 4038.

Thus, when the second structure body 4038 is provided to extend to a region where the spacer 4035 is to be formed, since the second structure body 4038 is formed using one continuous film, regions of the surface of the second structure body 4038 have substantially the same height and the spacer 4035 can be stably provided with good adhesion.

Further, by widely providing the second structure body 4038 to reach a region where the spacer 4035 is to be formed, when the spacer 4035 provided for a counter substrate is placed on an element substrate side, a region where the spacer 4035 can be stably placed can be wide. Note that the spacer 4035 is placed over a surface at the same height as the upper surface (the most projecting surface) of the second structure body 4038; therefore, even if the spacer 4035 provided for the counter substrate is moved to align on the element substrate side, the adjacent first structure body 4037 and the adjacent second structure body 4038 are not damaged.

Accordingly, defects in an arrangement step of the spacer 4035, due to misalignment of the spacer 4035, or the like can be reduced, leading to improvement in a yield.

The spacer 4035 can be stably provided in a substantially flat region with less steep unevenness and fewer steep steps in the liquid crystal display device; thus, damage and a shape defect of the spacer 4035 due to physical impact can be reduced and the liquid crystal display device can have high resistance to physical impact.

Accordingly, a liquid crystal display device which is resistant to physical impact and can retain high-quality display characteristics can be provided. Further, a liquid crystal display device with high reliability and high performance can be provided.

Although FIGS. 4A1, 4A2, and 4B illustrate an example of a transmissive liquid crystal display device, an embodiment of the present invention disclosed in this specification can also be applied to a transflective liquid crystal display device and a reflective liquid crystal display device.

For the first substrate 4001 and the second substrate 4006, glass, plastic, or the like having a light-transmitting property can be used. As plastic, a polyvinyl fluoride (PVF) film, a polyester film, or an acrylic resin film can be used. A sheet with a structure in which an aluminum foil is sandwiched between PVF films or polyester films, or a fiberglass-reinforced plastics (FRP) plate can also be used. Note that in the case of a reflective liquid crystal display device, a metal substrate such as an aluminum substrate or a stainless steel substrate may be used as the first substrate 4001 or the second substrate 4006 which is not on the viewing side.

FIGS. 4A1, 4A2, and 4B illustrate an example in which a polarizing plate is provided on the outer side (the viewing side) of the substrate; however, the polarizing plate may be provided on the inner side of the substrate. The position of the polarizing plate may be determined as appropriate depending on the material of the polarizing plate and conditions of the manufacturing process. Furthermore, a light-blocking layer serving as a black matrix may be provided.

In FIGS. 4A1, 4A2, and 4B, a light-blocking layer 4034 is provided on the second substrate 4006 side so as to cover the transistors 4010 and 4011. With the provision of the light-blocking layer 4034, the contrast can be increased and the transistors can be stabilized more.

A color filter layer or a light-blocking layer may be formed as part of the interlayer film 4021.

The transistor may be covered with the insulating layer 4020 functioning as a protective film; however, the present invention is not particularly limited thereto.

Note that the protective film is provided to prevent entry of contaminant impurities such as an organic substance, metal, and moisture in the air and is preferably a dense film. The protective film may be formed by a sputtering method to have a single-layer structure or a stacked-layer structure including any of a silicon oxide film, a silicon nitride film, a silicon oxynitride film, a silicon nitride oxide film, an aluminum oxide film, an aluminum nitride film, an aluminum oxynitride film, and an aluminum nitride oxide film.

In the case of further forming a light-transmitting insulating layer as a planarizing insulating film, the light-transmitting insulating layer can be formed using an organic material having heat resistance, such as polyimide, acrylic, a benzocyclobutene-based resin, polyamide, or epoxy. As an alternative to such organic materials, it is possible to use a low-dielectric constant material (low-k material), a siloxane-based resin, phosphosilicate glass (PSG), borophosphosilicate glass (BPSG), or the like. The insulating layer may be formed by stacking a plurality of insulating films formed of these materials.

There is no particular limitation on the method for forming the insulating layer having a stacked structure, and the following method can be employed depending on the material: a sputtering method, spin coating, a dip coating method, a spray coating method, a droplet discharging method (inkjet method), screen printing, offset printing, roll coating, curtain coating, knife coating, or the like.

The pixel electrode layer 4030 and the common electrode layer 4031 can be formed using a light-transmitting conductive material such as indium oxide containing tungsten oxide, indium zinc oxide containing tungsten oxide, indium oxide containing titanium oxide, indium tin oxide containing titanium oxide, indium tin oxide, indium zinc oxide, indium tin oxide to which silicon oxide is added, or graphene.

The pixel electrode layer 4030 and the common electrode layer 4031 can also be formed using one or more materials selected from metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy of any of these metals; and a nitride of any of these metals.

Alternatively, the pixel electrode layer 4030 and the common electrode layer 4031 can be formed using a conductive composition including a conductive high molecule (also referred to as a conductive polymer).

Further, a variety of signals and potentials are supplied to the signal line driver circuit 4003 which is separately formed, the scan line driver circuit 4004, or the pixel portion 4002 from an FPC 4018.

Further, since a transistor is easily broken by static electricity or the like, a protection circuit for protecting the driver circuit is preferably provided over the same substrate as a gate line or a source line. The protection circuit is preferably formed using a nonlinear element.

In FIGS. 4A1, 4A2, and 4B, a connection terminal electrode 4015 is formed using the same conductive film as that of the pixel electrode layer 4030, and a terminal electrode 4016 is formed using the same conductive film as that of source and drain electrode layers of the transistors 4010 and 4011.

The connection terminal electrode 4015 is electrically connected to a terminal included in the FPC 4018 via an anisotropic conductive film 4019.

Although FIGS. 4A1, 4A2, and 4B illustrate an example in which the signal line driver circuit 4003 is formed separately and mounted on the first substrate 4001, an embodiment of the present invention is not limited to this structure. The scan line driver circuit may be separately formed and then mounted, or only part of the signal line driver circuit or part of the scan line driver circuit may be separately formed and then mounted.

As described above, a liquid crystal display device which is resistant to physical impact and can retain high-quality display characteristics can be provided.

A liquid crystal display device with high reliability and high performance can be provided.

This embodiment can be implemented in appropriate combination with the structures described in the other embodiments.

Embodiment 4

In this embodiment, electronic devices according to an embodiment of the present invention will be described. Specifically, electronic devices in each of which the liquid crystal display device described in any of the above embodiments is used are described below with reference to FIGS. 6A to 6E.

Examples of the electronic devices to which the liquid crystal display device is applied are television sets (also referred to as televisions or television receivers), monitors of computers or the like, cameras such as digital cameras and digital video cameras, digital photo frames, mobile phones (also referred to as cell phones or cellular phones), portable game machines, portable information terminals, audio reproducing devices, and large-sized game machines such as pachinko machines. Specific examples of these electronic devices are shown in FIGS. 6A to 6E.

Figure 6A:
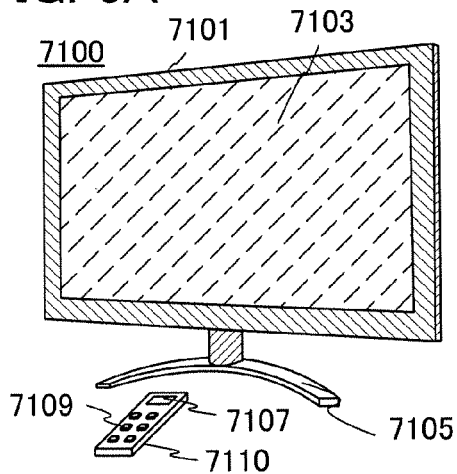
FIGS. 6A to 6E each illustrate an electronic device.

FIG. 6A illustrates an example of a television device. In a television device 7100, a display portion 7103 is incorporated in a housing 7101. Images can be displayed on the display portion 7103, and the liquid crystal display device described in any of the above embodiments can be used for the display portion 7103. Since the liquid crystal display device described in any of the above embodiments has high physical strength, a display defect does not occur even when physical impact is applied to the display portion in use; thus, the television device can be highly reliable. In addition, here, the housing 7101 is supported by a stand 7105.

The television device 7100 can be operated by an operation switch of the housing 7101 or a separate remote controller 7110. With operation keys 7109 of the remote controller 7110, channels and volume can be controlled and images displayed on the display portion 7103 can be controlled. Furthermore, the remote controller 7110 may be provided with a display portion 7107 for displaying data output from the remote controller 7110.

Note that the television device 7100 is provided with a receiver, a modem, and the like. With the receiver, a general television broadcast can be received. Moreover, when the television device 7100 is connected to a communication network with or without wires via the modem, one-way (from a sender to a receiver) or two-way (between a sender and a receiver or between receivers) information communication can be performed.

Figure 6B:
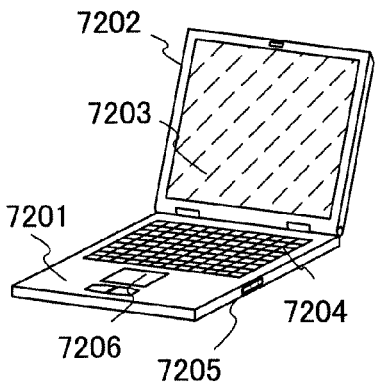

FIG. 6B illustrates a computer, which includes a main body 7201, a housing 7202, a display portion 7203, a keyboard 7204, an external connection port 7205, a pointing device 7206, and the like. The liquid crystal display device described in any of the above embodiments can be used for the display portion 7203 of the computer. Since the liquid crystal display device described in any of the above embodiments has high physical strength, a display defect does not occur even when physical impact is applied to the display portion in use or while the computer is carried around; thus, the computer can be highly reliable.

Figure 6C:
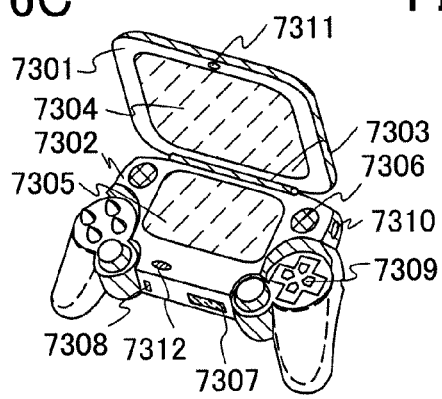

FIG. 6C illustrates a portable game machine having two housings, a housing 7301 and a housing 7302, which are connected with a joint portion 7303 so that the portable game machine can be opened or folded. A display portion 7304 is incorporated in the housing 7301 and a display portion 7305 is incorporated in the housing 7302. In addition, the portable game machine illustrated in FIG. 6C includes a speaker portion 7306, a recording medium insertion portion 7307, an LED lamp 7308, input means (an operation key 7309, a connection terminal 7310, a sensor 7311 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, tilt angle, vibration, smell, or infrared rays), and a microphone 7312), and the like. Needless to say, the structure of the portable game machine is not limited to the above; the liquid crystal display device described in any of the above embodiments can be used for at least one or both of the display portion 7304 and the display portion 7305. Further, the display portion 7304 and the display portion 7305 may each include another accessory. The portable game machine illustrated in FIG. 6C has a function of reading out a program or data stored in a storage medium to display it on the display portion, and a function of sharing information with another portable game machine by wireless communication. Note that the functions of the portable game machine illustrated in FIG. 6C are not limited to these functions, and the portable game machine can have various functions.

Figure 6D:
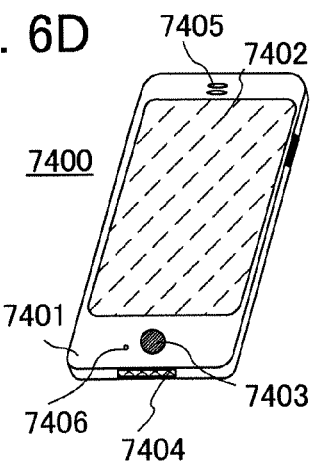

FIG. 6D illustrates an example of a mobile phone. A mobile phone 7400 is provided with a display portion 7402 incorporated in a housing 7401, operation buttons 7403, an external connection port 7404, a speaker 7405, a microphone 7406, and the like. The liquid crystal display device described in any of the above embodiments can be used for the display portion 7402 of the mobile phone 7400. Since the liquid crystal display device described in any of the above embodiments has high physical strength, a display defect does not occur even when physical impact is applied to the display portion in use or while the mobile phone is carried around; thus, the mobile phone can be highly reliable.

When the display portion 7402 of the mobile phone 7400 illustrated in FIG. 6D is touched with a finger or the like, data can be input into the mobile phone 7400. Further, operations such as making a call and creating an e-mail can be performed by touch on the display portion 7402 with a finger or the like.

There are mainly three screen modes of the display portion 7402. The first mode is a display mode mainly for displaying images. The second mode is an input mode mainly for inputting data such as text. The third mode is a display-and-input mode in which two modes of the display mode and the input mode are combined.

For example, in the case of making a call or creating an e-mail, a text input mode mainly for inputting text is selected for the display portion 7402 so that text displayed on a screen can be input. In that case, it is preferable to display a keyboard or number buttons on almost all the area of the screen of the display portion 7402.

When a detection device including a sensor for detecting inclination, such as a gyroscope or an acceleration sensor, is provided inside the mobile phone 7400, display on the screen of the display portion 7402 can be automatically changed by determining the orientation of the mobile phone 7400 (whether the mobile phone is placed horizontally or vertically for a landscape mode or a portrait mode).

The screen modes are switched by touching the display portion 7402 or operating the operation buttons 7403 of the housing 7401. Alternatively, the screen modes can be switched depending on kinds of images displayed on the display portion 7402. For example, when a signal of an image displayed on the display portion is a signal of moving image data, the screen mode is switched to the display mode. When the signal is a signal of text data, the screen mode is switched to the input mode.

Moreover, in the input mode, when input by touching the display portion 7402 is not performed within a specified period while a signal is detected by an optical sensor in the display portion 7402, the screen mode may be controlled so as to be switched from the input mode to the display mode.

The display portion 7402 may function as an image sensor. For example, an image of a palm print, a fingerprint, or the like is taken by touch on the display portion 7402 with the palm or the finger, whereby personal authentication can be performed. Further, by providing a backlight or a sensing light source which emits a near-infrared light in the display portion, an image of a finger vein, a palm vein, or the like can be taken.

Figure 6E:
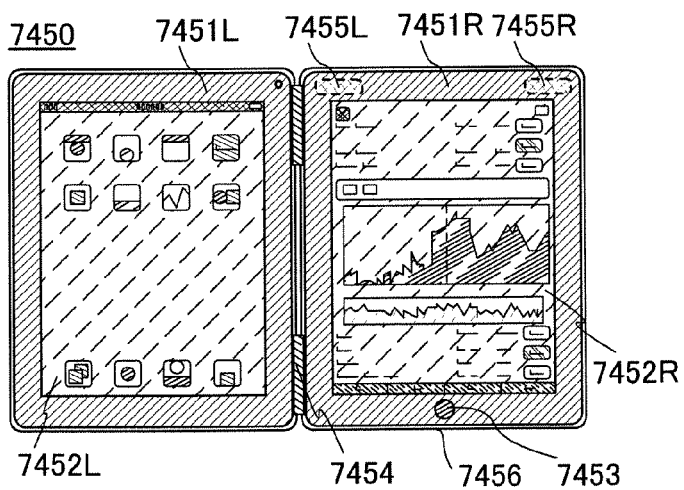

FIG. 6E illustrates an example of a flat computer. A flat computer 7450 includes a housing 7451L and a housing 7451R connected by hinges 7454. The flat computer 7450 further includes an operation button 7453, a left speaker 7455L, and a right speaker 7455R. In addition, a side surface of the flat computer 7450 is provided with an external connection port 7456, which is not illustrated. Note that when the flat computer is folded on the hinges 7454 so that a display portion 7452L provided in the housing 7451L and a display portion 7452R provided in the housing 7451R can face each other, the display portions can be protected by the housings.

Each of the display portions 7452L and 7452R is a component which can display images and to which information can be input by touch with a finger or the like. For example, when the icon for the installed program is selected by touch with a finger, the program can be started. Further, changing the distance between fingers touching two positions of the displayed image enables zooming in or out on the image. Drag of a finger touching one position of the displayed image enables drag and drop of the image. Moreover, selection of the displayed character or symbol on the displayed image of a keyboard by touch with a finger enables information input. The liquid crystal display device described in any of the above embodiments can be used for each of the display portions 7452L and 7452R of the flat computer 7450. Since the liquid crystal display device described in any of the above embodiments has high physical strength, a display defect does not occur in the display portions even when the display portions are touched; thus, the flat computer can be highly reliable.

Further, the flat computer 7450 can also include a gyroscope, an acceleration sensor, a global positioning system (GPS) receiver, a fingerprint sensor, or a video camera. For example, when a detection device including a sensor for detecting inclination, such as a gyroscope or an acceleration sensor, is provided, display on the screen can be automatically changed by determining the orientation of the flat computer 7450 (whether the computer is placed horizontally or vertically for a landscape mode or a portrait mode).

Furthermore, the flat computer 7450 can be connected to a network. The flat computer 7450 not only can display information on the Internet but also can be used as a terminal which controls another electronic device connected to the network from a distant place.

This embodiment can be implemented in appropriate combination with the structures described in the other embodiments.

This application is based on Japanese Patent Application serial no. 2011-255623 filed with Japan Patent Office on Nov. 23, 2011, the entire contents of which are hereby incorporated by reference.

What is claimed is:

1. A liquid crystal display device comprising:
   a first substrate and a second substrate with a liquid crystal composition interposed therebetween;
   a first structure body projecting into the liquid crystal composition from a surface of the first substrate on a liquid crystal composition side;
   a second structure body provided between a first region and a second region of the first structure body and projecting into the liquid crystal composition from the surface of the first substrate on the liquid crystal composition side;
   a first electrode layer over the first structure body;
   a second electrode layer over the second structure body; and
   a spacer over and in contact with the first structure body or the second structure body,
   wherein the first structure body and the second structure body are each continuously provided, and
   wherein each of the first electrode layer and the second electrode layer is not in contact with the spacer.

2. The liquid crystal display device according to claim 1, wherein a side surface of the first structure body and a side surface of the second structure body are tapered.

3. The liquid crystal display device according to claim 2, wherein part of each of the first electrode layer and the second electrode layer covers the side surface of the first structure body or the side surface of the second structure body.

4. The liquid crystal display device according to claim 1, wherein the liquid crystal composition comprises nematic liquid crystal and a chiral material and exhibits a blue phase.

5. The liquid crystal display device according to claim 1, wherein the liquid crystal composition comprises a high molecular compound.

6. The liquid crystal display device according to claim 1, wherein the first electrode layer and the second electrode layer are in contact with the liquid crystal composition.

7. The liquid crystal display device according to claim 1, wherein the first electrode layer and the second electrode layer each have a comb-like shape.

8. The liquid crystal display device according to claim 1, wherein a transistor is provided between the first substrate, and the first electrode layer and the second electrode layer, and
   wherein the first electrode layer is electrically connected to the transistor.

9. A liquid crystal display device comprising:
   a first substrate and a second substrate with a liquid crystal composition interposed therebetween;
   a plurality of first structure bodies projecting into the liquid crystal composition from a surface of the first substrate on a liquid crystal composition side;
   a plurality of second structure bodies provided between the plurality of first structure bodies and projecting into the liquid crystal composition from the surface of the first substrate on the liquid crystal composition side;
   a first electrode layer over the plurality of first structure bodies;
   a second electrode layer over the plurality of second structure bodies; and
   a spacer over and in contact with at least one of the plurality of first structure bodies and the plurality of second structure bodies,
   wherein each of the first electrode layer and the second electrode layer is not in contact with the spacer.

10. The liquid crystal display device according to claim 9, wherein side surfaces of the first structure bodies and side surfaces of the second structure bodies are tapered.

11. The liquid crystal display device according to claim 10, wherein part of each of the first electrode layer and the second electrode layer covers the side surfaces of the first structure bodies or the side surfaces of the second structure bodies.

12. The liquid crystal display device according to claim 9, wherein the liquid crystal composition comprises nematic liquid crystal and a chiral material and exhibits a blue phase.

13. The liquid crystal display device according to claim 9, wherein the liquid crystal composition comprises a high molecular compound.

14. The liquid crystal display device according to claim 9, wherein the first electrode layer and the second electrode layer are in contact with the liquid crystal composition.

15. The liquid crystal display device according to claim 9, wherein the first electrode layer and the second electrode layer each have a comb-like shape.

16. The liquid crystal display device according to claim 9, wherein a transistor is provided between the first substrate, and the first electrode layer and the second electrode layer, and
   wherein the first electrode layer is electrically connected to the transistor.

* * * * *